US012563581B2

(12) United States Patent
Yum et al.

(10) Patent No.: US 12,563,581 B2
(45) Date of Patent: Feb. 24, 2026

(54) USER EQUIPMENT IN COMMUNICATION WITH SERVING CELL, AND OPERATING METHODS OF USER EQUIPMENT IN COMMUNICATION WITH SERVING CELL

(71) Applicant: Samsung Electronics Co., Ltd., Suwon-si (KR)

(72) Inventors: Kunil Yum, Suwon-si (KR); Yangsoo Kwon, Suwon-si (KR); Jungmin Park, Suwon-si (KR); Huiwon Je, Suwon-si (KR); Hyunseung Joo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 488 days.

(21) Appl. No.: 17/968,323

(22) Filed: Oct. 18, 2022

(65) Prior Publication Data

US 2023/0123526 A1     Apr. 20, 2023

(30) Foreign Application Priority Data

Oct. 19, 2021   (KR) ........................ 10-2021-0139740
Jun. 10, 2022   (KR) ........................ 10-2022-0071026

(51) Int. Cl.
*H04W 72/541*      (2023.01)
*H04L 5/00*        (2006.01)
*H04W 72/23*       (2023.01)

(52) U.S. Cl.
CPC ......... *H04W 72/541* (2023.01); *H04L 5/0051* (2013.01); *H04L 5/0053* (2013.01); *H04W 72/23* (2023.01)

(58) Field of Classification Search
CPC .. H04W 72/541; H04W 72/23; H04L 5/0051; H04L 5/0053
See application file for complete search history.

(56) References Cited

U.S. PATENT DOCUMENTS

| | | | |
|---|---|---|---|
| 9,161,236 | B2 | 10/2015 | Seo et al. |
| 9,584,293 | B2 | 2/2017 | Li |
| 9,877,279 | B2 | 1/2018 | Kim et al. |
| 9,955,487 | B2 | 4/2018 | Shin et al. |
| 10,448,351 | B2 | 10/2019 | Yoo et al. |
| 10,555,317 | B2 | 2/2020 | Yamada et al. |
| 10,680,741 | B2 | 6/2020 | Oh et al. |
| 10,687,225 | B2 | 6/2020 | Jongren et al. |
| 10,868,653 | B2 | 12/2020 | Iyer et al. |

(Continued)

OTHER PUBLICATIONS

EESR dated Jul. 10, 2023 for corresponding EP Patent Application No. 22202181.8.

(Continued)

*Primary Examiner* — Jackie Zuniga Abad
(74) *Attorney, Agent, or Firm* — Harness, Dickey & Pierce, P.L.C.

(57)          ABSTRACT

An operation method of user equipment (UE) in communication with a serving cell, the operation method includes receiving configuration information of a first physical downlink control channel (PDCCH) from the serving cell, the first PDCCH corresponding to an interference cell, identifying the first PDCCH based on the configuration information, and demodulating a physical downlink shared channel (PDSCH) based on a result of the identifying, the PDSCH being received from the serving cell.

20 Claims, 20 Drawing Sheets

(56) References Cited

U.S. PATENT DOCUMENTS

| | | | |
|---|---|---|---|
| 2014/0355469 | A1 | 12/2014 | Kang et al. |
| 2016/0157243 | A1 | 6/2016 | Janis et al. |
| 2019/0200332 | A1* | 6/2019 | Hwang ................. H04L 5/0082 |
| 2020/0145982 | A1* | 5/2020 | Cheng ................... H04L 5/0053 |
| 2021/0289517 | A1 | 9/2021 | Li et al. |
| 2021/0385826 | A1* | 12/2021 | Moon ................... H04L 1/0046 |

OTHER PUBLICATIONS

Ericsson: "PDSCH start for NAICS", 3GPP Draft; R4-144814_NAICS_PDSCH_START_V3, 3rd Generation Partnership Project (3GPP), Mobile Competence Centre ; 650, Route Des Lucioles ; F-06921 Sophia-Antipolis Cedex ; France vol. RAN WG4, no. Dresden, Germany; Aug. 17, 2014 (Aug. 17, 2014), XP050799392, Retrieved from the Internet: URL:http://www.3gpp.org/ftp/Meetings_3GPP_SYNC/RAN4/Docs/ [retrieved on Aug. 17, 2014].

Intel Corporation: "Scenarios and interference models for LTE DL Control Channels IM" , 3GPP Draft; R4-155608—Intel—Control IM Scenarios, 3rd Generation Partnership Project (3GPP), Mobile Competence Centre ; 650, Route Des Lucioles ; F-06921 Sophia-Antipolis Cedex ; France vol. RAN WG4, no. Sophia Antipolis, France; Oct. 12, 2015-Oct. 16, 2015 Oct. 5, 2015 (Oct. 5, 2015), XP051027884, Retrieved from the Internet: URL:http://www.3gpp.org/ftp/tsg_ran/WG4_Radio/TSGR4_76bis/Docs/ [retrieved on 2015-10- 05].

Intel Corporation: "EPDCCH ICIC in Small Cell Environment", 3GPP Draft; RI-135110_EPDCCH_ICIC_RI, 3rd Generation Partnership Project (3GPP), Mobile Competence Centre ; 650, Route Des Lucioles ; F-06921 Sophia-Antipolis Cedex ; France vol. RAN WGI, no. San Francisco, USA; Nov. 11, 2013-Nov. 15, 2013 Nov. 13, 2013 (Nov. 13, 2013), XP050734812, Retrieved from the Internet: URL:http://www.3gpp.org/ftp/Meetings_3GPP_SYNC/RAN/RANI/Docs/.

PESR dated Mar. 14, 2023 for corresponding EP Patent Application No. 22202181.8.

ETSI TS 138 213 V16.6.0 (Aug. 2021), 5G; NR; Physical layer procedures for control, (3GPP TS 38.213 version 16.6.0 Release 16).

ETSI TS 138 331 V16.5.0 (Sep. 2021), 5G; NR; Radio Resource Control (RRC); Protocol specification, (3GPP TS 38.331 version 16.5.0 Release 16).

* cited by examiner

Radio frame 214

Subframe 205

Slot 206

N_BW subcarriers 204

N_RB subcarriers 210

Resource element 212

Resource Block 208

$N_{symb}$ OFDM symbols 202

Frequency

Time

| Index | SS/PBCH block and CORESET multiplexing pattern | Number of RBs | Number of Symbols | Offset(RBs) |
|---|---|---|---|---|
| 1 | A1 | B1 | C1 | D1 |
| ⋮ | ⋮ | ⋮ | ⋮ | ⋮ |
| k | Ak | Bk | Ck | Dk |

Server

2300

2160

Vehicle

2250

2200

Access Point

2100

Home Gadget

2140

Entertainment

2120

Home Appliances

USER EQUIPMENT IN COMMUNICATION WITH SERVING CELL, AND OPERATING METHODS OF USER EQUIPMENT IN COMMUNICATION WITH SERVING CELL

CROSS-REFERENCE TO RELATED APPLICATIONS

This application is based on and claims priority under 35 U.S.C. § 119 to Korean Patent Application Nos. 10-2021-0139740, filed on Oct. 19, 2021 and 10-2022-0071026, filed on Jun. 10, 2022, in the Korean Intellectual Property Office, the disclosures of which are incorporated by reference herein in their entireties.

BACKGROUND

The inventive concepts relate to wireless communication, and more particularly, to user equipment (UE) communicating with a serving cell, and an operation method of the user equipment.

A UE may receive interference from an interference cell adjacent to the UE when communicating with a serving cell. At this time, the UE may demodulate signal received from the serving cell considering the interference from the inter-ference cell. In the $3^{rd}$ generation partnership project (3GPP) long-term evolution (LTE) specification, a physical down-link control channel (PDCCH) length is determined by only a control format indicator (CFI), transmitted through a corresponding channel bandwidth, and a physical control format indicator channel (PCFICH), and thus, the UE may demodulate a physical downlink shared channel (PDSCH) of the serving cell with a relatively small complexity, such as by detecting PDCCH and PDSCH regions of the inter-ference cell in a blind manner or receiving the PCFICH of the interference cell.

In the 3GPP new radio (NR) specification, a coreset may be more variously set compared with LTE. For example, a frequency domain in which a coreset is disposed, and a duration in a time domain of the coreset may be set more variously than LTE. Thus, when the coreset configuration of the serving cell is different from the coreset configuration of the interfering cell, a portion of a PDSCH region of the serving cell in a UE may receive a PDCCH of the interfer-ence cell rather than a PDSCH of the interference cell. In this case, assuming that the PDSCH of the interference cell is received as an interference when the UE demodulates the PDSCH of the serving cell as in a conventional LTE network, demodulation performance (or reception perfor-mance) for the PDSCH may degrade in a portion of the PDSCH region of the serving cell due to a wrong assump-tion. In this case, a method that may be considered in existing LTE may not be usable in NR because of a com-plicated coreset configuration, compared with existing LTE, and the absence of a separate channel (e.g., PCFICH) for transmitting.

SUMMARY

According to embodiments, a new method is provided for addressing the aforementioned challenges. The inventive concepts provide user equipment (UE) for improving physi-cal downlink shared channel (PDSCH) reception perfor-mance by determining whether a PDSCH received from a serving cell interferes with a physical downlink control channel (PDCCH) of an interference cell, based on configu-ration related information of the PDCCH of the interference cell, and demodulating the PDSCH, based on a result of the determination, in the UE and an operation method of the UE.

According to an aspect of the inventive concepts, there is provided an operation method of user equipment (UE) in communication with a serving cell, the operation method includes receiving configuration information of a first physi-cal downlink control channel (PDCCH) from the serving cell, the first PDCCH corresponding to an interference cell, identifying the first PDCCH based on the configuration information, and demodulating a physical downlink shared channel (PDSCH) based on a result of the identifying, the PDSCH being received from the serving cell.

According to an aspect of the inventive concepts, there is provided an operation method of user equipment (UE) in communication with a serving cell, the operation method including receiving configuration information of a first physical downlink control channel (PDCCH) from the serv-ing cell, the first PDCCH corresponding to an interference cell, identifying a difference between a duration of a PDCCH region of the serving cell and a duration of a PDCCH region of the interference cell, based on the con-figuration information, and demodulating a physical down-link shared channel (PDSCH) received from the serving cell based on the difference.

According to an aspect of the inventive concepts, there is provided UE including a radio frequency (RF) transceiver configured to receive configuration information of a first physical downlink control channel (PDCCH) from a serving cell, the first PDCCH corresponding to an interference cell, and a controller configured to determine whether a physical downlink shared channel (PDSCH) and the first PDCCH overlap each other by identifying the first PDCCH based on the configuration information to obtain a determination result, the PDSCH being received from the serving cell, and demodulate the PDSCH based on the determination result.

BRIEF DESCRIPTION OF THE DRAWINGS

Embodiments will be more clearly understood from the following detailed description taken in conjunction with the accompanying drawings in which:

FIG. 13B is a table for explaining FIG. 13A in detail;

FIG. 15 is a conceptual diagram of an Internet of things (IoT) network system according to embodiments.

DETAILED DESCRIPTION

Figure 1:
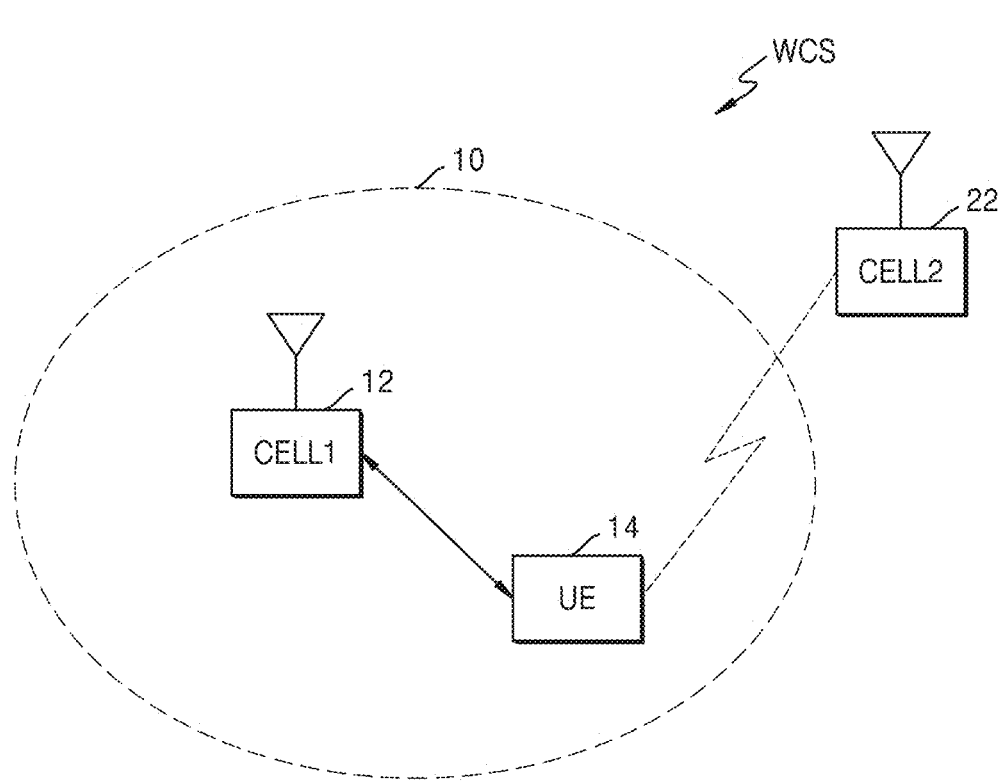
FIG. 1 is a block diagram of a wireless communication system according to embodiments.

FIG. 1 is a block diagram illustrating a wireless communication system WCS according to embodiments.

Although embodiments are described below in accordance with a wireless communication system WCS based on a new radio (NR) network, and more particularly, with the $3^{rd}$ Generation Partnership Project (3GPP) Release 17, embodiments are not limited to the NR network and may be applied to other wireless communication systems (e.g., cellular communication systems based on next-generation communication, such as long term evolution (LTE), LTE-advanced (LTE-A), wireless broadband (WiBro), or global system for mobile communication (GSM), or local area communication systems using Bluetooth or near field communication (NFC)), which have a similar technical background or channel configuration.

In addition, various functions described hereinafter may be implemented or supported by artificial intelligence technology or one or more computer programs, and each of the programs is formed of computer-readable program code and executed in a computer-readable recording medium. "An application" and "a program" refer to one or more computer programs, software components, instruction sets, processes, functions, objects, classes, instances, related data, or parts thereof suitable for implementation of pieces of computer-readable program code. "Computer-readable program code" include all types of computer code including source code, object code, and execution code. "Computer-readable media" include all types of media that may be accessed by a computer, such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-transitory computer-readable media include a medium in which data may be permanently stored and a medium in which data may be stored and may be overwritten later such as a rewritable optical disk or an erasable memory device.

In embodiments described below, a hardware access method is described as an example. However, in embodiments, because technology using both hardware and software is included, embodiments do not exclude a software-based access method.

Referring to FIG. 1, the wireless communication system WCS may include a first cell 12, user equipment (UE) 14, and/or a second cell 22. The first and second cells 12 and 22 may generally refer to a fixed station communicating with the UE 14 and/or other cells (not shown), and may exchange data and control information with the UE 14 and/or the other cell through communication. For example, the first and second cells 12 and 22 may each be referred to as a base station, a Node B, an evolved-Node B (eNB), a next generation Node (gNB), a sector, a site, a Base Transceiver System (BTS), an Access Point (AP), a relay node, a Remote Radio Head (RRH), a Radio Unit (RU), or a small cell.

The UE 14 may be fixed or may be mobile, and may refer to a device capable of transmitting and receiving data and/or control information to and from any one of the first and second cells 12 and 22 through communication. For example, the UE 14 may refer to a terminal, terminal equipment, a Mobile Station (MS), a Mobile Terminal (MT), a User Terminal (UT), a Subscriber Station (SS), a wireless communication device, a wireless device, or a handheld device.

The first cell 12 may provide WiBro access to the UE 14 in a coverage 10 thereof. Herein, the first cell 12 performing communication with the UE 14 may be referred to as a serving cell. The second cell 22 is a cell adjacent to the UE 14, and the UE 14 may receive unwanted interference from the second cell 22. Herein, the second cell 22 may be referred to as an interference cell for the UE 14. Herein, embodiments are described based on the premise that there is one interfering cell 22 for the UE 14, but this is merely an example for convenience of description, and the inventive concepts are not limited thereto. It will be fully understood that the technical spirit of the inventive concepts are also applicable even when there are a plurality of interference cells.

According to embodiments, the UE 14 may receive configuration related information (may also be referred to herein as configuration information) of a physical downlink control channel (PDCCH) of the interference cell 22 from the serving cell 12. The serving cell 12 may receive the configuration related information of the PDCCH of the interference cell 22 through signaling of the configuration related information of the PDCCH with the interference cell 22, and may further transmit configuration related information of a PDCCH of the serving cell 12 to the interference cell 22. The configuration related information of the PDCCH of the serving cell 12 may be attached to the interference cell 22 and provided to another UE (not shown) that recognizes the serving cell 12 as an interference cell.

According to embodiments, the configuration related information of the PDCCH of the interference cell 22 may include information used by the UE 14 to identify the location of a PDCCH region of the interference cell 22. Herein, the PDCCH region may be defined as resources in a time-frequency domain allocated to transmit the PDCCH, and may be interpreted in the same concept, or a similar concept, as the coreset. Herein, the PDSCH region may be defined as resources in a time-frequency domain allocated to transmit the PDSCH. For example, the configuration related information of the PDCCH of the interference cell 22 may include at least one of a CORESET configuration of the interference cell 22 and/or a search space configuration of the interference cell 22. However, this is merely an example, and the inventive concepts are not limited thereto. The configuration related information of the PDCCH of the interference cell 22 may include more pieces of information to identify the location of the PDCCH region of the interference cell 22.

According to embodiments, the configuration related information of the PDCCH of the interference cell 22 may further include information used by the UE 14 to identify whether the interference cell 22 has actually transmitted the PDCCH through the PDCCH region. For example, the configuration related information of the PDCCH of the interference cell 22 may further include demodulation reference signal (DMRS) configuration information of the PDCCH of the interference cell 22. The DMRS configuration information of the PDCCH of the interference cell 22 may include a DMRS scramble ID of the PDCCH of the interference cell 22 or a cell ID of the interference cell 22, which may be used by the UE 14 to ascertain a DMRS sequence of the PDCCH of the interference cell 22.

According to embodiments, the UE 14 may identify the PDCCH of the interference cell 22, based on the configuration related information of the PDCCH of the interference cell 22. Herein, the identification of the PDCCH of the interference cell 22 may include at least one of an operation of identifying the PDCCH region of the interference cell 22 and/or an operation of identifying whether the interference cell 22 has actually transmitted the PDCCH through the PDCCH region of the interference cell 22. The operation, performed by the UE 14, of identifying the PDCCH of the interference cell 22 may be based on the configuration related information of the PDCCH of the interference cell 22.

According to embodiments, the UE 14 may demodulate the PDSCH received from the serving cell 12, based on a result of the identification. Herein, the demodulation of the PDSCH may include a demodulation preprocessing operation of measuring interference from an interference cell with respect to a PDSCH and performing interference whitening on the measured interference. Thus, PDSCH demodulation methods being the same as, similar to, or different from each other may be interpreted as demodulation preprocessing methods being the same as, similar to, or different from each other.

For example, the UE 14 may identify an overlapping region (may also be referred to herein as an overlapping subregion) of the PDSCH region of the serving cell 12 that overlaps the PDCCH region of the interference cell 22, and a remaining region (may also be referred to herein as a remaining subregion), and may perform first demodulation on a PDSCH (e.g., a first portion of the PDSCH of the serving cell) corresponding to the overlapping region and second demodulation on a PDSCH (e.g., a second portion of the PDSCH of the serving cell) corresponding to the remaining region. In other words, the UE 14 may distinguishably demodulate the PDSCH corresponding to the overlapping region and the PDSCH corresponding to the remaining region. Herein, the remaining region may correspond to a region of the PDSCH region of the serving cell 12 that overlaps the PDSCH region of the interference cell 22. According to embodiments, the remaining region includes the entirety of the PDSCH excluding the overlapping region.

When the UE 14 is unable to identify whether the interference cell 22 has actually transmitted the PDCCH through the overlapping region (e.g., when the configuration related information of the PDCCH of the interference cell 22 does not include the DMRS configuration information of the PDCCH of the interference cell 22), the first demodulation and the second demodulation may be based on different manners. When the UE 14 is able to identify whether the interference cell 22 has actually transmitted the PDCCH through the overlapping region (e.g., when the configuration related information of the PDCCH of the interference cell 22 includes the DMRS configuration information of the PDCCH of the interference cell 22), the first demodulation and the second demodulation may be based on the same manners, similar manners, or different manners. The first modulation and the second demodulation will be described later in more detail.

Because the interference cell 22 transmits the PDSCH, based on beamforming, the reception intensity of the PDSCH may be greater than that of the PDCCH. When the UE 14 wrongly recognizes the interference from the interference cell 22 as the PDSCH instead of the PDCCH from a portion of the PDSCH region of the serving cell 12, the entire interference may be incorrectly measured as being smaller than the real interference, and thus, demodulation performance with respect to the PDSCH of the serving cell 12 may be reduced. Thus, the UE 14 according to embodiments may identify whether the interference for the PDSCH received from the serving cell 12 includes the PDCCH of the interference cell 22, thereby measuring the interference for the PDSCH with greater accuracy and demodulating the PDSCH based on the measured interference. As a result, the demodulation performance with respect to the PDSCH of the UE 14 may be improved, leading to an improvement in the communication performance of the UE 14.

Herein, embodiments of demodulating the PDSCH of a serving cell considering overlapping between the PDSCH of the serving cell and the PDCCH of an interference cell are mainly described, but the inventive concepts are not limited thereto. The inventive concepts are sufficiently applicable even when another channel of a serving cell is demodulated considering overlapping of heterogeneous channels between the serving cell and the interference cell.

According to embodiments, a PDSCH region and/or a PDCCH region may refer to time-frequency resources over which a corresponding PDSCH and/or PDCCH, respectively, is transmitted. According to embodiments, a portion of a PDSCH region and/or a portion of a PDCCH region, or a subregion of the PDSCH region and/or a subregion of the PDCCH region, may refer to a portion, subregion or subset of the time-frequency resources of the PDSCH region and/or PDCCH region, respectively. According to embodiments, a PDSCH and/or a PDCCH may refer to a PDSCH and/or a PDCCH, respectively, that a corresponding cell is configured to transmit, the time-frequency resources over which the corresponding cell is configured to transmit the PDSCH and/or the PDCCH, respectively, and/or a signal transmitted by the corresponding cell over the PDSCH and/or the PDCCH, respectively.

According to embodiments, the UE 14 may obtain received data (e.g., application data, a paging message, an RRC signaling message, etc.) from the demodulated PDSCH of the serving cell. According to embodiments, the UE 14 may execute an operation of an application running on the UE 14 based on the received data. According to embodiments, the UE 14 may initiate and/or receive a communication with respect to another UE and/or cell based on the received data. According to embodiments, the UE 14 may transmit a data signal to the serving cell 12 in response to the received data.

Figure 2:
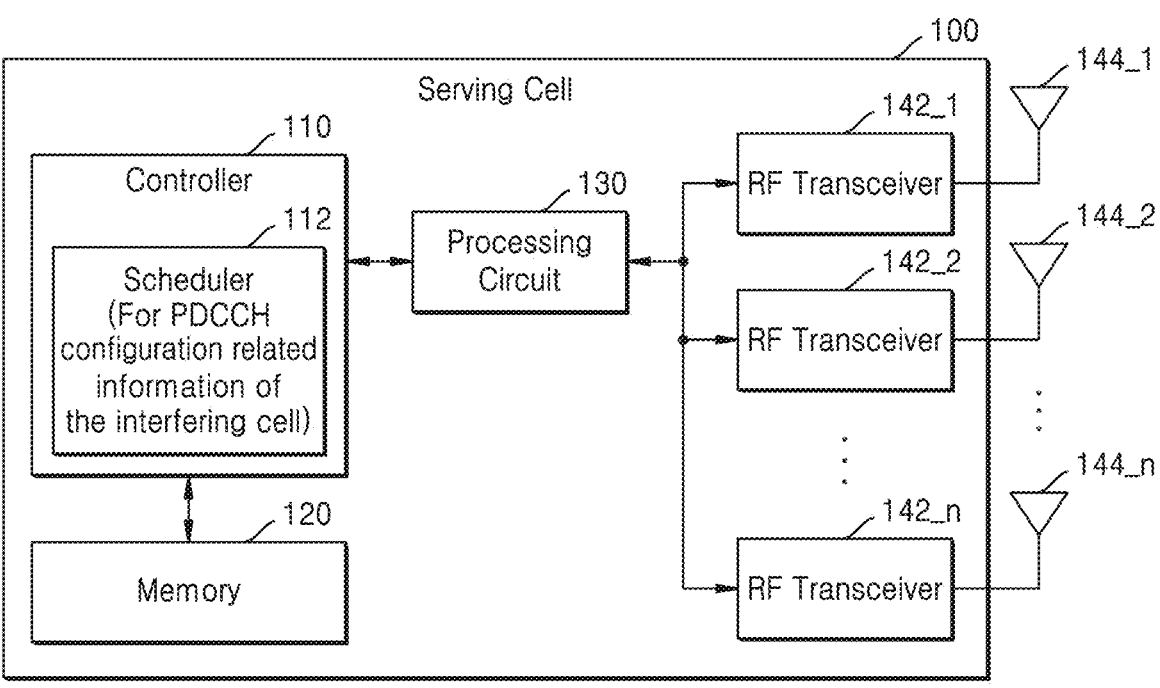
FIGS. 2 and 3 are block diagrams of implementations of a serving cell and user equipment (UE), according to embodiments.
Figure 3:
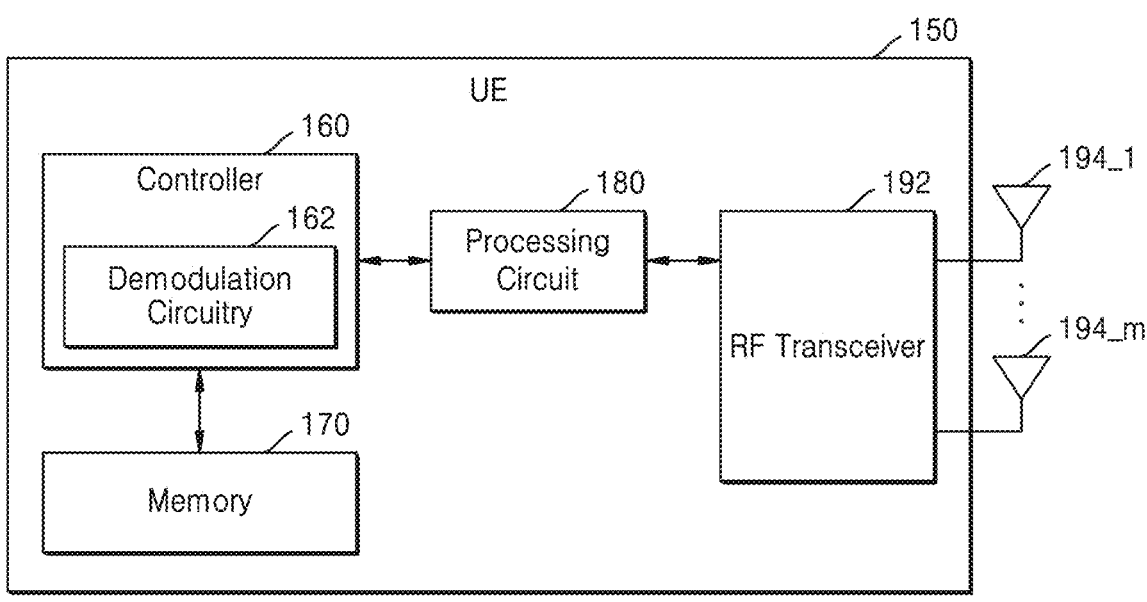

FIGS. 2 and 3 are block diagrams of implementations of a serving cell 100 and UE 150, respectively, according to embodiments. The implementations of the serving cell 100 of FIG. 2 and the UE 150 of FIG. 3 may be respectively applied to the first cell 12 and the UE 14 in FIG. 1.

Referring to FIG. 2, the serving cell 100 may include a controller 110, a memory 120, a processing circuit 130, a plurality of radio frequency (RF) transceivers 142_1 through 142_n (e.g., a first RF transceiver 142_1, a second RF transceiver 142_2, ... an nth RF transceiver 142_n), and/or a plurality of antennas 144_1 through 144_n (e.g., a first antenna 144_1, a second antenna 144_2, ... an nth antenna 144_n). Each of the RF transceivers 142_1 through 142_n may receive an RF signal from UE in a coverage (e.g., a coverage area) through one or more (e.g., a corresponding one) of the antennas 144_1 through 144_n. Each of the RF transceivers 142_1 through 142_n** may generate an intermediate frequency (IF) or a baseband signal by performing frequency down-conversion on the received RF signal. The processing circuit 130 may generate data signals by filtering, decoding, and/or digitizing IF or baseband signals. The controller 110 may additionally process the data signals.

The processing circuit 130 may receive data signals from the controller 110. The processing circuit 130 may encode, multiplex, and/or convert digital to analog the received data signals. The RF transceivers 142_1 through 142_n may perform frequency up-conversion on IF or baseband signals output from the processing circuit 130, and transmit RF signals to UEs through the antennas 144_1 through 144_n.

The controller 110 may control the serving cell 100 for NR network-based communication, and may include a scheduler 112 that performs scheduling on resources to transmit PDCCH configuration related information of an interference cell to UE in the coverage of the serving cell 100.

According to embodiments, the scheduler 112 may collect pieces of configuration related information of the PDCCH from the interference cell of the UE. In detail, the scheduler 112 may directly request the interference cell for the configuration related information of the PDCCH, or exchange the configuration related information of the respective PDCCHs of the serving cell 100 and the interference cell with the interference cell in a period (e.g., a defined, determined or arbitrary period). The interference cell may be changed with a location change, a communication state change, etc. within the coverage of the UE, and the scheduler 112 may periodically or non-periodically update the configuration related information of the PDCCH of the interference cell for the UE considering a change in the interference cell.

According to embodiments, the scheduler 112 may allocate the resources of a time-frequency domain to transmit the configuration related information of the PDCCH of the interference cell to the UE. For example, the scheduler 112 may schedule the configuration related information of the PDCCH of the interference cell to be transmitted to the UE in a period for radio resource control (RRC) signaling with the UE.

The controller 110 may execute a program and/or process stored in the memory 120 to generally control the serving cell 100. In embodiments, the scheduler 112 may be stored in the memory 120 as program code, which is executed to perform scheduling according to embodiments, and the controller 110 may access the memory 120 and execute the program code such that the operation of the scheduler 112 is performed.

Referring to FIG. 3, the UE 150 may include a controller 160, a memory 170, a processing circuit 180, an RF transceiver 192, and/or a plurality of antennas 194_1 through 194_m.

The RF transceiver 192 may receive RF signals from a serving cell through the antennas 194_1 to 194_m. The RF transceiver 192 may down-convert the received RF signals into IF or baseband signals. The processing circuit 180 may generate data signals by filtering, decoding, and/or digitizing IF or baseband signals. The controller 160 may additionally process the data signals.

The processing circuit 180 may receive data signals from the controller 160. The processing circuit 180 may encode, multiplex, and/or convert into analog the received data signals. The RF transceiver 192 may perform frequency up-conversion on IF or baseband signals output from the processing circuit 180 and transmit RF signals to the antennas 194_1 to 194_m.

The controller 160 according to embodiments may control the UE 150 for NR network-based communication, and may include demodulation circuitry 162 that demodulates a PDSCH, based on configuration related information of the PDCCH of an interference cell, received from the serving cell.

According to embodiments, the demodulation circuitry 162 may distinguish an overlapping region of a PDSCH region of the serving cell that overlaps a PDCCH region of the interference cell from a remaining region, based on the configuration related information of the PDCCH of the interference cell, and may perform first demodulation on a PDSCH corresponding to the overlapping region and perform second demodulation corresponding to the remaining region.

According to embodiments, when the configuration related information of the PDCCH of the interference cell includes information used to identify a location of the PDCCH region of the interference cell or when the configuration related information of the PDCCH of the interference cell further includes information used to identify whether the interference cell has actually transmitted the PDCCH through the PDCCH region, the demodulation circuitry 162 may demodulate the PDSCH in somewhat different manners. Details thereof will be described later with reference to FIGS. 9 and 10.

The controller 160 may execute a program and/or process stored in the memory 170 to generally control the UE 150. In embodiments, the demodulation circuitry 162 may be stored in the memory 170 as program code, which is executed to perform demodulation on the PDSCH according to embodiments, and the controller 160 may access the memory 170 and execute the stored program code such that the operation of the demodulation circuitry 162 is performed.

Figure 4A:
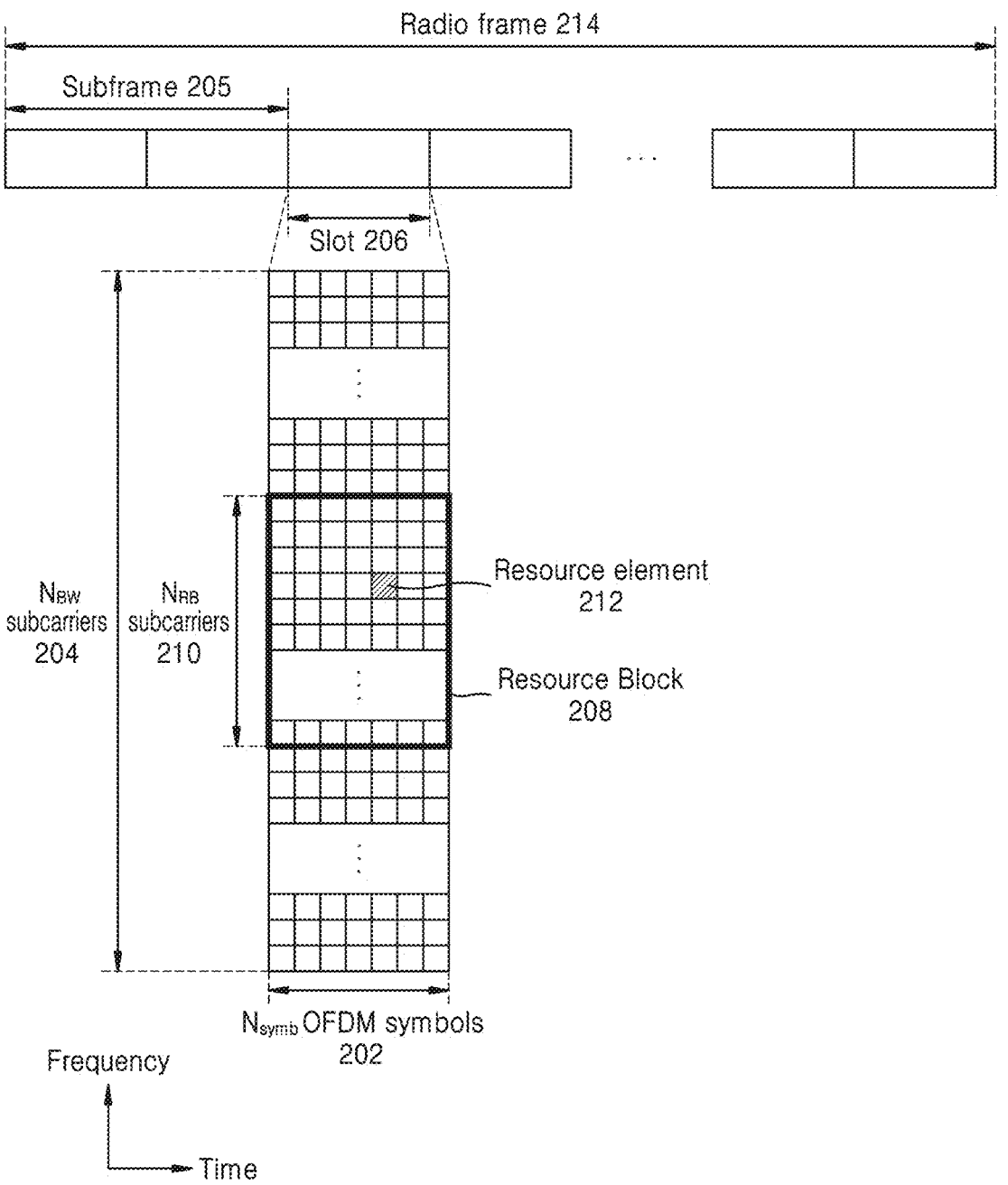
FIG. 4A is a diagram illustrating the basic structure of a time-frequency domain, which is a wireless resource domain in a wireless communication system according to embodi-ments.
Figure 4B:
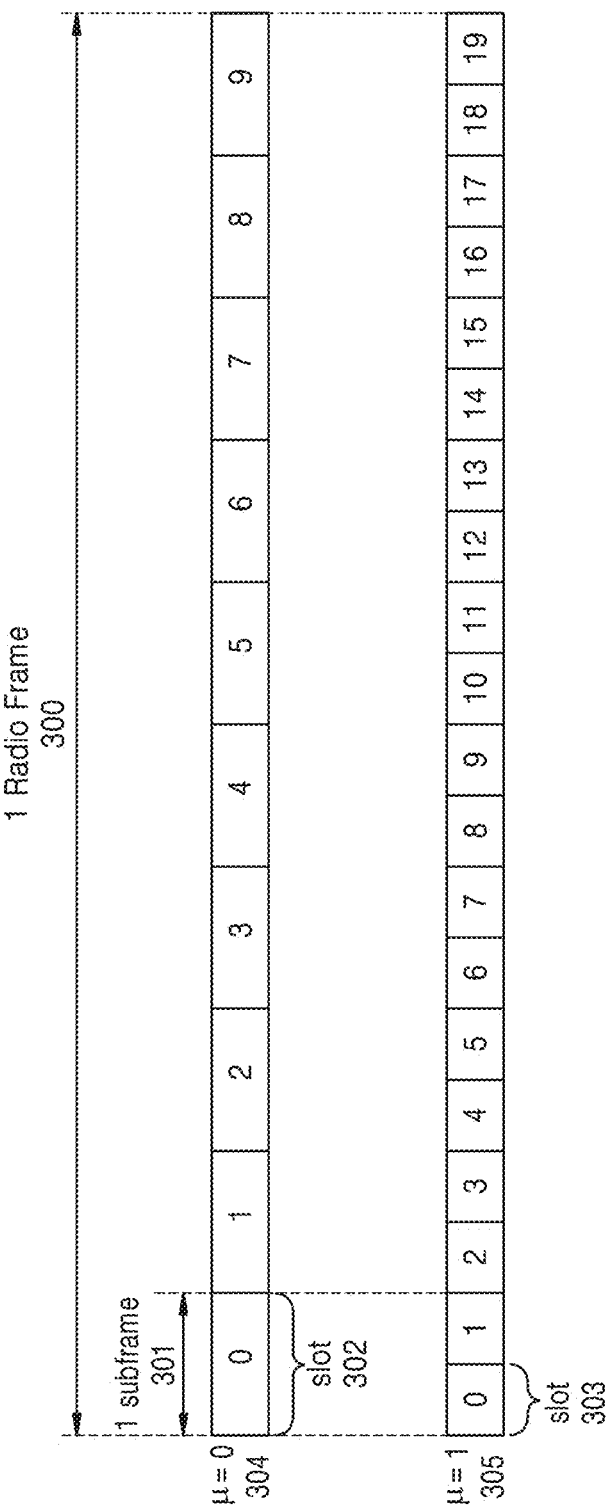
FIG. 4B is a diagram illustrating the slot structure of a wireless communication system according to embodi-ments.

FIG. 4A is a diagram illustrating the basic structure of a time-frequency domain, which is a wireless resource domain in a wireless communication system according to embodiments. FIG. 4B is a diagram illustrating the slot structure of a wireless communication system according to embodiments.

Referring to FIG. 4A, the horizontal axis is a time domain and the vertical axis is a frequency domain. A minimum (or smallest) transmission unit in the time domain is an orthogonal frequency division multiplexing (OFDM) symbol, and $N_{symb}$ OFDM symbols 202 may constitute a single slot 206. Two slots may constitute a single subframe 205. For example, the length of the slot 206 may be 0.5 ms, and the length of the subframe 205 may be 1.0 ms. However, this is just an example, and the length of the slot 206 may vary with the configuration thereof. The number of slots 206 included in the subframe 205 may vary with the length of the slot 206. The time-frequency domain may be defined based on the slot 206 in an NR network. A radio frame 214 may correspond to a time-domain unit constituted of ten subframes 205.

A minimum (or smallest) transmission unit in the frequency domain is a subcarrier, and a total system transmission bandwidth may include $N_{BW}$ subcarriers 204. A basic unit of a resource in the time-frequency domain is a resource element (RE) 212 and may be represented by an OFDM symbol index and a subcarrier index. A resource block (RB) 208 may be defined by $N_{symb}$ consecutive OFDM symbols 202 in the time domain and $N_{RB}$ consecutive subcarriers 210 in the frequency domain. Accordingly, one RB 208 may include Nsymb×$N_{RB}$ REs 212. An RB pair may correspond to a unit of two RBs consecutive along the time axis and include $N_{symb}*2 \ N_{RB}$ REs 212.

Some of the resources in the time-frequency domain in FIG. 4A may be included in a PDSCH region of a serving cell, and the PDSCH region of the serving cell may include an overlapping region that overlaps a PDCCH region of the interference cell. In this case, the UE according to embodiments may receive the configuration related information of the PDCCH of the interference cell from the serving cell, distinguish an overlapping region of the PDSCH region of the serving cell that overlaps the PDCCH region of the interference cell from a remaining region, and perform the first demodulation on a PDSCH corresponding to the overlapping region and the second demodulation on a PDSCH corresponding to the remaining region.

Referring further to FIG. 4B, a radio frame 300 may be defined to be 10 ms, and a subframe 301 may be defined to be 1 ms. The radio frame 300 may include a total of ten subframes 301. A slot 302 and a slot 303 may be defined to be 14 OFDM symbols (e.g., the number of symbols per slot $(N_{symb}^{slot})=14$). The subframe 301 may include one slot 302 or a plurality of slots 303. The number of slots 302 or 303 per one subframe 301 may vary with a subcarrier spacing set value μ or the number of symbols included in the slot 302 or 303. FIG. 4B shows a case 304 in which the subcarrier spacing set value μ=0 and a case 305 in which the subcarrier spacing set value μ=1. In the case 304 where the subcarrier spacing set value μ=0, the subframe 301 may include one slot 302. In the case 305 where the subcarrier spacing set value μ=1, the subframe 301 may include two slots 303.

As described above, the number of slots per subframe may vary with the subcarrier spacing set value μ, and accordingly, the number of slots per frame may be changed. The number of slots per subframe according to the subcarrier spacing set value μ, $N_{slot}^{subframe,\mu}$, and the number of slots per frame according to the subcarrier spacing set value $N_{slot}^{frame,\mu}$, may be defined as shown in Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In embodiments, the number of slots per subframe may vary with the number of symbols included in one slot.

According to embodiments, the serving cell and the interference cell may vary with the subcarrier spacing set value μ, and the coreset configuration of the serving cell and the coreset configuration of the interference cell may be different from each other according to the different subcarrier spacing set values. The serving cell may provide the configuration related information of the PDCCH of the interference cell to the UE so that the UE recognizes that the coreset configuration of the serving cell is different from the coreset configuration of the interference cell. The UE may demodulate the PDSCH received from the serving cell, based on the configuration related information of the PDCCH of the interference cell.

Figure 5A:
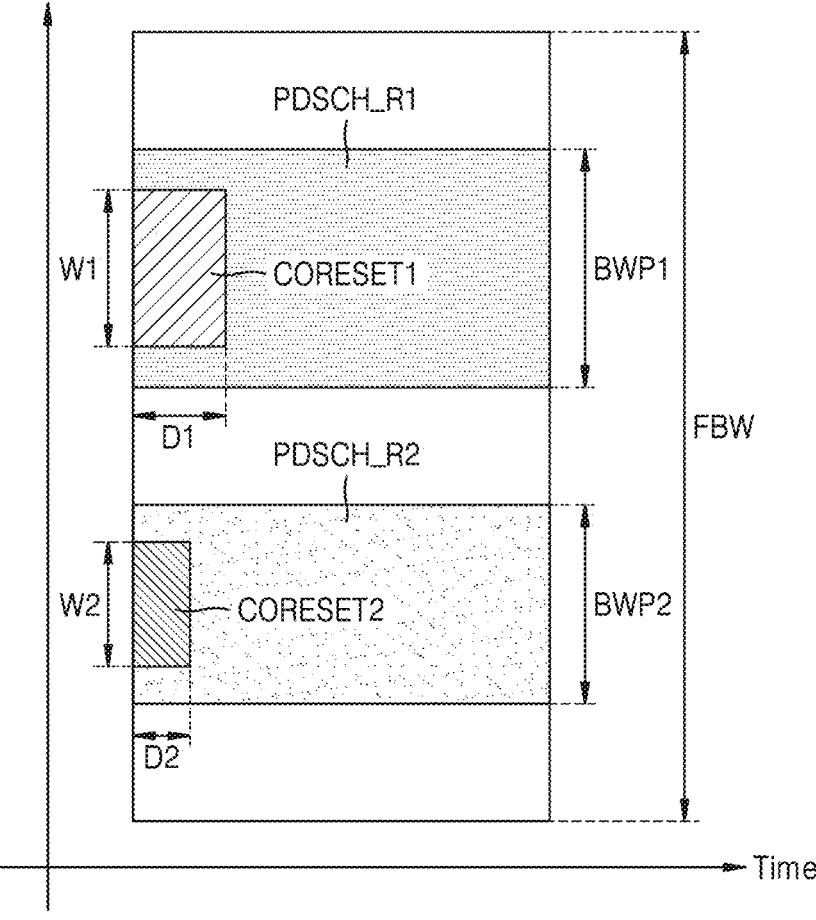
FIGS. 5A through 5C are diagrams illustrating the coreset of an NR network to explain coreset configuration informa-tion and search space configuration information included in configuration related information of a PDCCH according to embodiments.
Figure 5B:
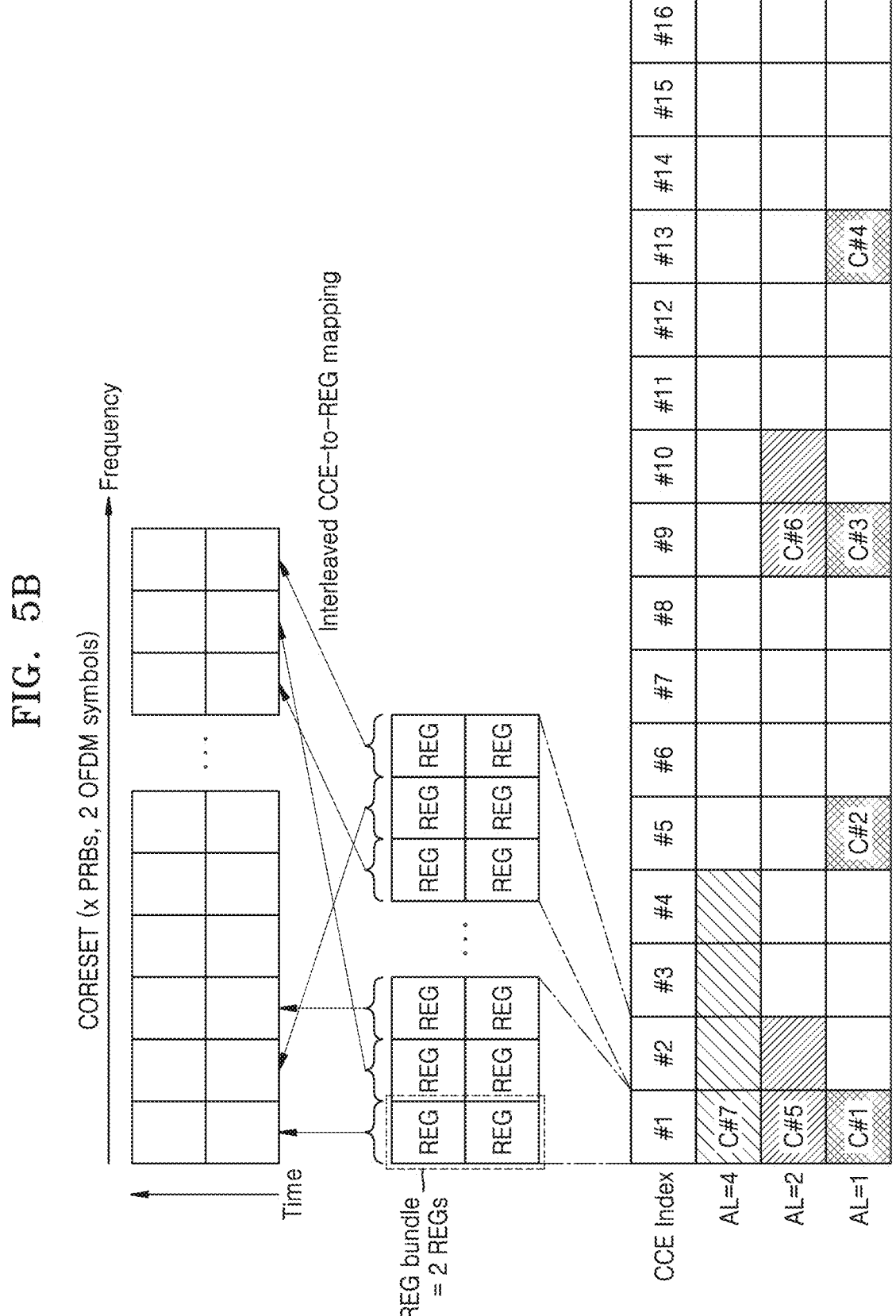
Figure 5C:
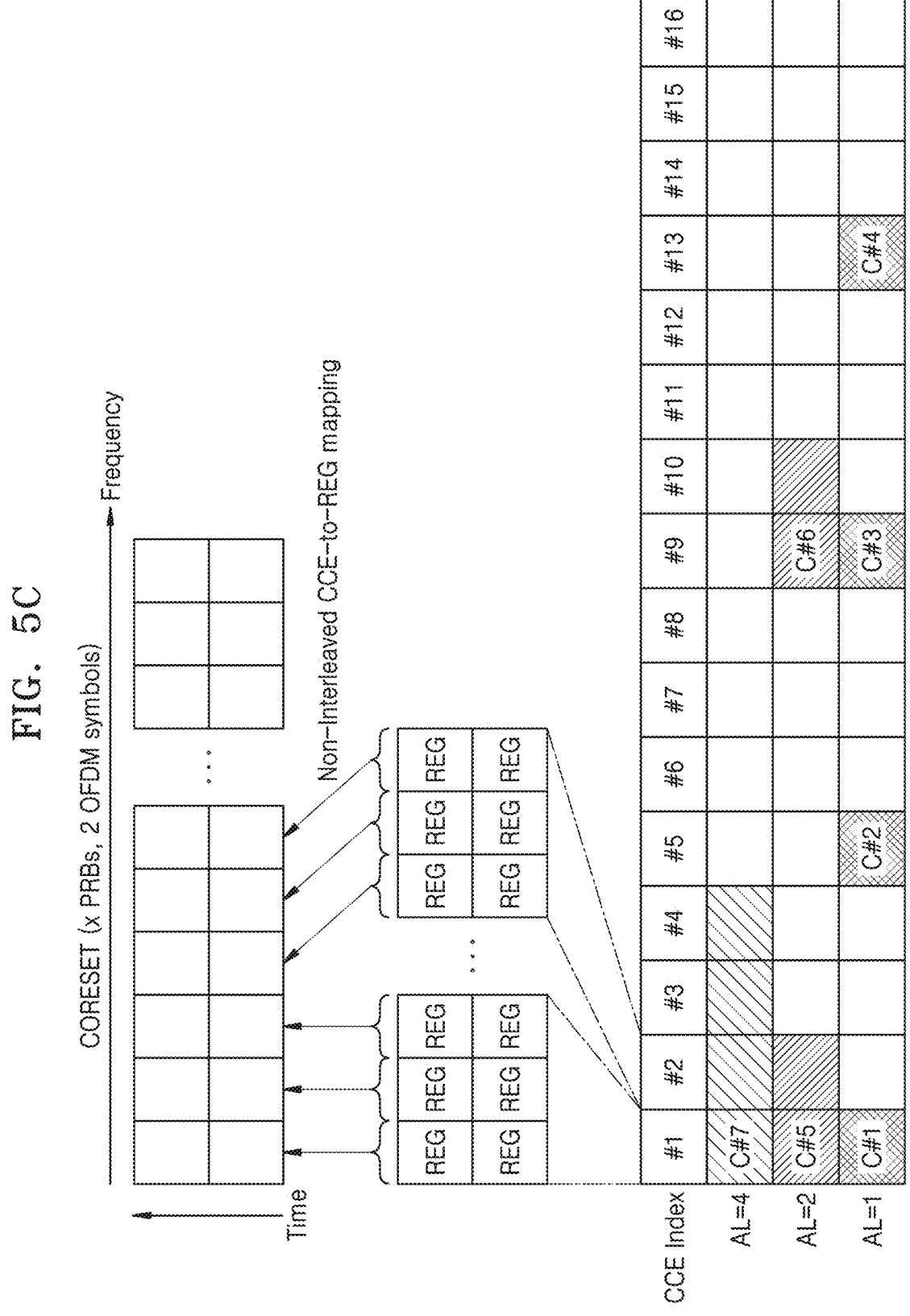

FIGS. 5A through 5C are diagrams illustrating the coreset of an NR network to explain coreset configuration information and search space configuration information included in configuration related information of a PDCCH according to embodiments.

The coreset may be a concept including a set of parameters used to carry a set of physical resources (or a specific region of an NR downlink resource grid) and PDCCH/downlink control information (DCI). The location of the coreset may be localized in a specific region in a frequency domain. As described above, the coreset may be interpreted in the same concept as, or a similar concept to, a PDCCH region.

First and second coresets CORESET1 and CORESET2 to be described with reference to FIG. 5A may correspond to an example of coresets that may be configured in the serving cell or the interference cell. Because the serving cell and the interference cell may variously configure coresets, the coreset configuration of the serving cell may be different from the coreset configuration of the interference cell.

Referring to FIG. 5A, the first coreset CORESET1 may be included in a first bandwidth portion BWP1 together with a first PDSCH region PDSCH_R1, and the second coreset CORESET2 may be included in a second bandwidth portion BWP2 together with a second PDSCH region PDSCH_R2. The first and second bandwidth portions BWP1 and BWP2 may correspond to portions of a full bandwidth FBW of the NR network.

In the NR network, frequency domain widths W1 and W2 of the first and second coresets CORESET1 and CORESET2 may be set as values (e.g., arbitrary values), which are multiples of a 6RB (resource block), and there may be a first parameter related to the frequency domain widths W1 and W2 of the first and second coresets CORESET1 and CORESET2.

In the NR network, there may be a second parameter related to time domain length (or durations D1 and D2) of the first and second coresets CORESET1 and CORESET2.

There also may be a third parameter related to an RB offset for indicating the locations of the first and second coresets CORESET1 and CORESET2, and a fourth parameter related to starting/ending of the first and second bandwidth portions BWP1 and BWP2.

The coreset configuration information of the interference cell according to embodiments may include at least one of the first through fourth parameters capable of specifying the location of the coreset of the interference cell.

For example, the serving cell and the interference cell may configure their coresets as the first coresets CORESET1 having different first durations D1, respectively, and the UE may identify whether a first PDSCH region PDSCH_R1 of the serving cell and a first coreset CORESET1 of the interference cell overlap each other, through the coreset configuration information of the interference cell. In other words, the UE may identify whether there is a difference between the first durations D1 of the first coreset CORESET1 of the serving cell and the second coreset CORESET2 of the interference cell through the coreset configuration information of the interference cell. A detailed example thereof will be described with reference to FIGS. 9 and 10.

Referring further to FIG. 5B, a coreset may include "x" physical RBs (PRBs) in the frequency domain and two OFDM symbols in the time domain. In detail, the coreset may include a plurality of RE groups (REGs), and two REGs may constitute a single REG bundle. For example, an REG may include twelve REs in the frequency domain and one OFDM symbol in the time domain. A control channel element (CCE) may include six REGs. REGs included in first through sixteenth CCEs #1 through #16 may undergo interleaved CCE-to-REG mapping.

An aggregation level (AL) may indicate the number of CCEs allocated for a PDCCH. The number of candidates may vary with an AL. For example, when an AL is 1, the first CCE #1, the fifth CCE #5, the ninth CCE #9, and the thirteenth CCE #13 may respectively correspond to first to fourth candidates C #1, C #2, C #3, and C #4. When an AL is 2, the first CCE #1 and the second CCE #2 may correspond to a fifth candidate C #5, and the ninth CCE #9 and the tenth CCE #10 may correspond to a sixth candidate C #6. When an AL is 4, the first through fourth CCEs #1, #2, #3, and #4 may correspond to a seventh candidate C #7. Candidates refer to a blind decoding target for UE to receive (or obtain) a PDCCH transmitted from a serving cell, and accordingly, an AL may be related to search space configuration.

Referring further to FIG. 5C, unlike FIG. 5B, three REG bundles included in CCEs #1 to #16 may undergo 'Non-Interleaved CCE-to-REG mapping'.

As shown in FIGS. 5B and 5C, the coreset configuration information may further include information about a CCE-REG mapping type. The information about a CCE-REG mapping type may include at least one of a fifth parameter indicating either 'Interleaved CCE-to-REG mapping' or 'Non-Interleaved CCE-to-REG mapping', and/or a sixth parameter related to sizes of the REG bundles (or the numbers of REGs included in the REG bundles).

According to embodiments, the search space configuration information may include a seventh parameter related to a coreset ID used by a cell, an eighth parameter related to a monitoring cycle, a ninth parameter related to a monitoring symbol bitmap within a slot, and a tenth parameter related to the AL. The search space configuration information may be used to facilitate identification of the coreset, together with the coreset configuration information.

According to embodiments, the configuration related information of the PDCCH may further include the DMRS configuration information of the PDCCH. The DMRS configuration information of the PDCCH may include an eleventh parameter related to the scrambling ID indicating a specific DMRS sequence. The UE may receive the configuration related information of the PDCCH of the interference cell including the DMRS configuration information of the PDCCH of the interference cell, and may measure interference by using the DMRS sequence conforming to the DMRS of the PDCCH of the interference cell. The UE may demodulate the PDSCH of the serving cell by using the measured interference. This will be described in detail later.

According to embodiments, the serving cell may transmit only the coreset configuration information of the interference cell to the UE, or may add at least one of the search space configuration information of the interference cell and/or the DMRS configuration information of the PDCCH of the interference cell to the coreset configuration information of the interference cell and transmit a result of the addition. However, this is only an example, the inventive concepts are not limited thereto, and various pieces of information (e.g., precoder granularity-related information or a coreset pool index) for enabling the UE to identify the PDCCH of the interference cell, that is, the coreset of the interference cell, may be transmitted to the UE.

Figure 6:
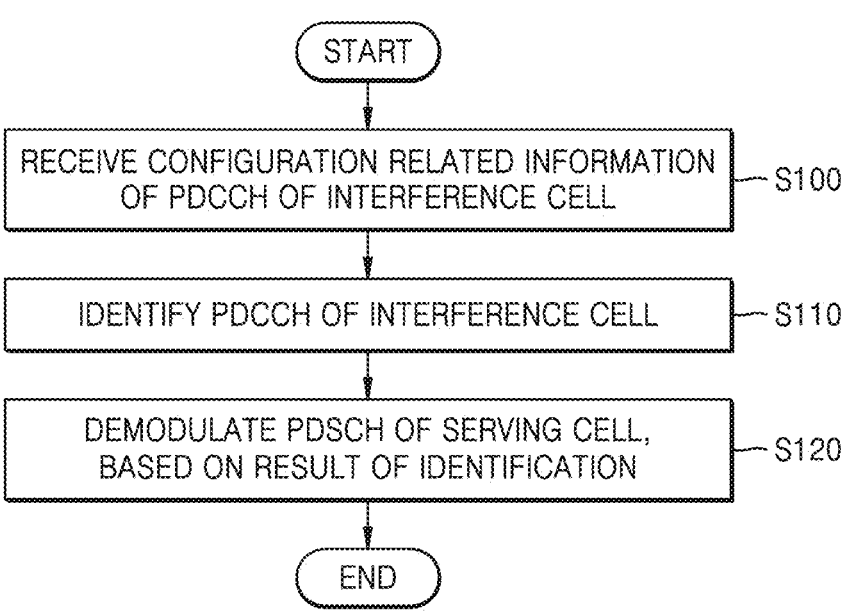
FIG. 6 is a flowchart of an operation method of UE, according to embodiments.

FIG. 6 is a flowchart of an operation method of UE, according to embodiments.

Referring to FIG. 6, in operation S100, the UE may receive the configuration related information of the PDCCH of the interference cell. According to embodiments, the UE may receive the configuration related information of the PDCCH of the interference cell from the serving cell. According to embodiments, the UE may directly receive related information (e.g., configuration related information) of a PDCCH from the interference cell.

In operation S110, the UE may identify the PDCCH of the interference cell, based on the configuration related information of the PDCCH of the interference cell. According to embodiments, the UE may identify the overlapping region of the PDSCH region of the serving cell, that overlaps the PDCCH region of the interference cell, and the remaining region. The UE may identify whether the interference cell actually transmits the PDCCH through the PDCCH region of the interference cell, and furthermore the UE may directly measure the DMRS of the PDCCH of the interference cell in the overlapping region and use the measured DMRS to demodulate the PDSCH of the serving cell.

In operation S120, the UE may demodulate the PDSCH of the serving cell, based on a result of the identification. According to embodiments, the UE may perform the first demodulation on the PDSCH corresponding to the overlapping region, and may perform the second demodulation on the PDSCH corresponding to the remaining region. In other words, the UE may distinguishably demodulate the PDSCH corresponding to the overlapping region and the PDSCH corresponding to the remaining region.

Figure 7:
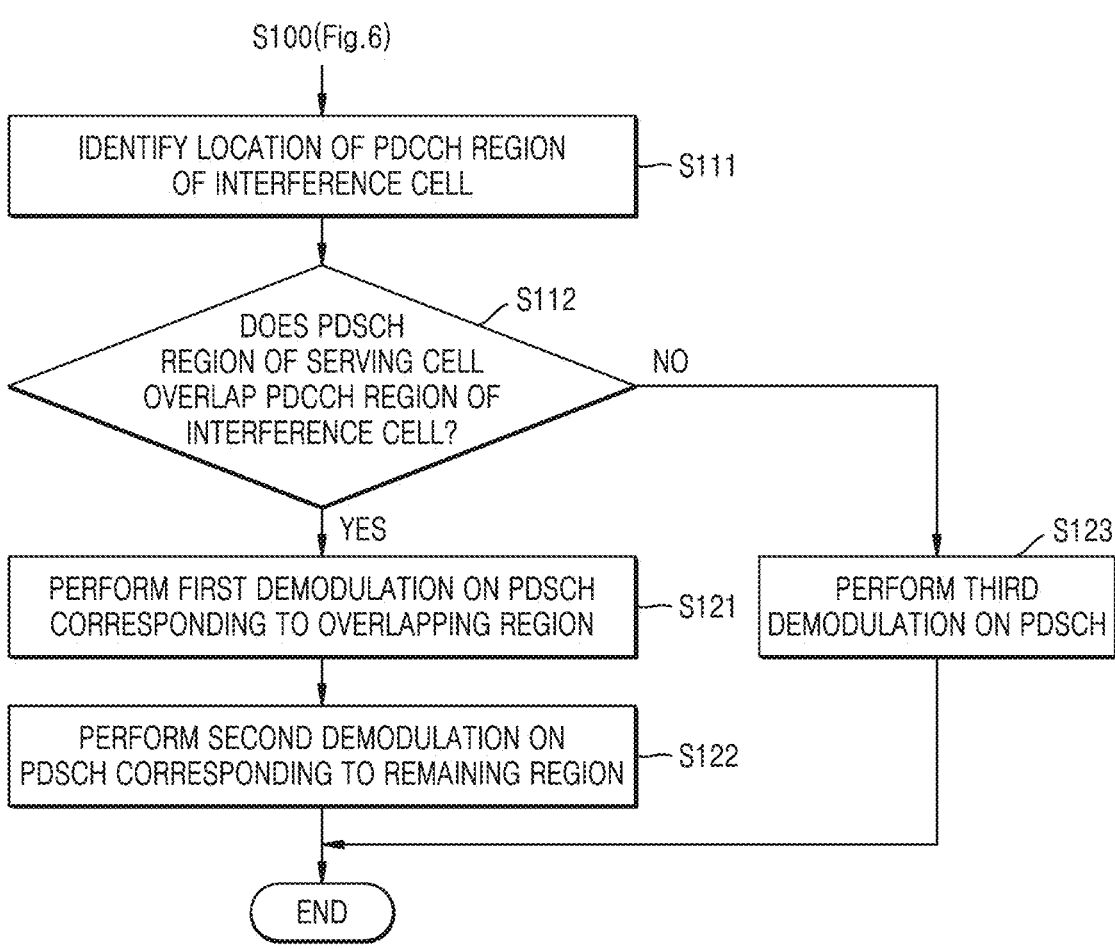
FIG. 7 is a flowchart of an example of operation S110 and operation S120 of FIG. 6.

FIG. 7 is a flowchart of an example of operation S110 and operation S120 of FIG. 6.

Referring to FIG. 7, subsequent to operation S100 of FIG. 6, in operation S111, the UE may identify the location of the PDCCH region of the interference cell. According to embodiments, the configuration related information of the PDCCH of the interference cell may include at least one of the coreset configuration information of the interference cell and/or the search space configuration information of the interference cell. The UE may identify the location of the PDCCH region (or the coreset) of the interference cell, based on at least one of the coreset configuration information of the interference cell and/or the search space configuration information of the interference cell.

In operation S112, the UE may determine whether the PDSCH region of the serving cell overlaps the PDCCH region of the interference cell. The UE may receive the coreset configuration information of the serving cell from the serving cell to identify the PDSCH region of the serving cell, and may determine whether the PDSCH region of the serving cell overlaps the PDCCH region of the interference cell identified in operation S111.

When the result of operation S112 is 'YES', operation S121 may be performed in which the UE performs the first demodulation on the PDSCH corresponding to the overlapping region among the PDSCH received from the serving cell. According to embodiments, the first demodulation may be measuring interference for the PDSCH corresponding to the overlapping region, performing the first interference whitening on the measured interference for the PDSCH by applying a first covariance matrix to the measured interference, and then demodulating the PDSCH corresponding to the overlapping region.

In operation S122, the UE may perform the second demodulation on the PDSCH corresponding to the remaining region among the PDSCH received from the serving cell. According to embodiments, the second demodulation may be measuring interference for the PDSCH corresponding to the remaining region, performing the second interference whitening by applying a second covariance matrix to the measured interference, and then demodulating the PDSCH corresponding to the remaining region.

According to embodiments, the first covariance matrix may be configured to be suitable for the case of interference due to the PDCCH of the interference cell, and the second covariance matrix may be configured to be suitable for the case of interference due to the PDSCH of the interference cell. For example, the first covariance matrix and the second covariance matrix may be different from each other.

When the result of operation S112 is 'NO', operation S123 is performed in which the UE performs third demodulation on the PDSCH received from the serving cell. According to embodiments, the third demodulation may be measuring interference for the PDSCH (e.g., due to the PDSCH of the interference cell), performing the second interference whitening by applying the second covariance matrix to the measured interference, and then demodulating the PDSCH.

Figure 8A:
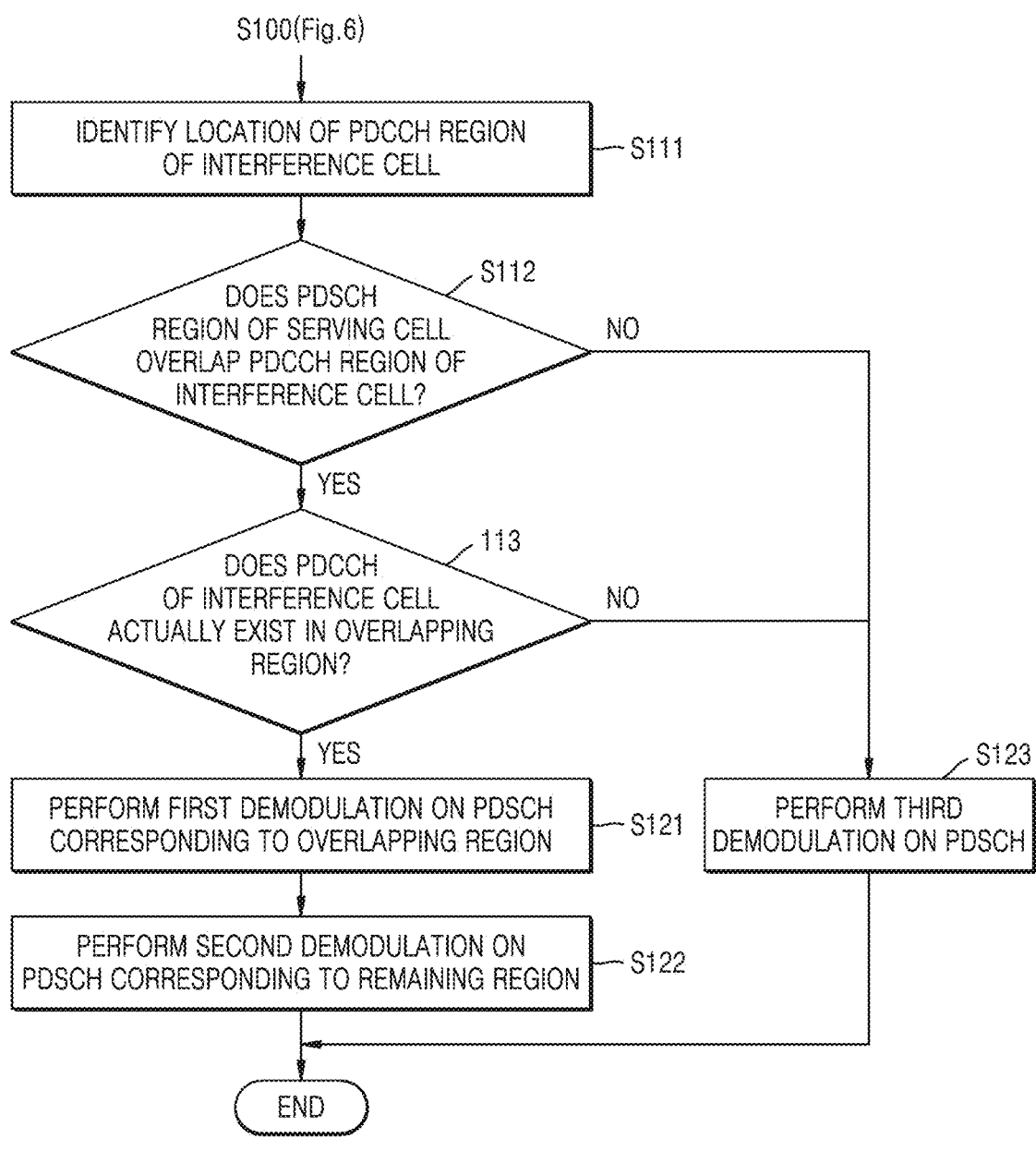
FIG. 8A is a flowchart of another example of operation S110 and operation S120 of FIG. 6.
Figure 8B:
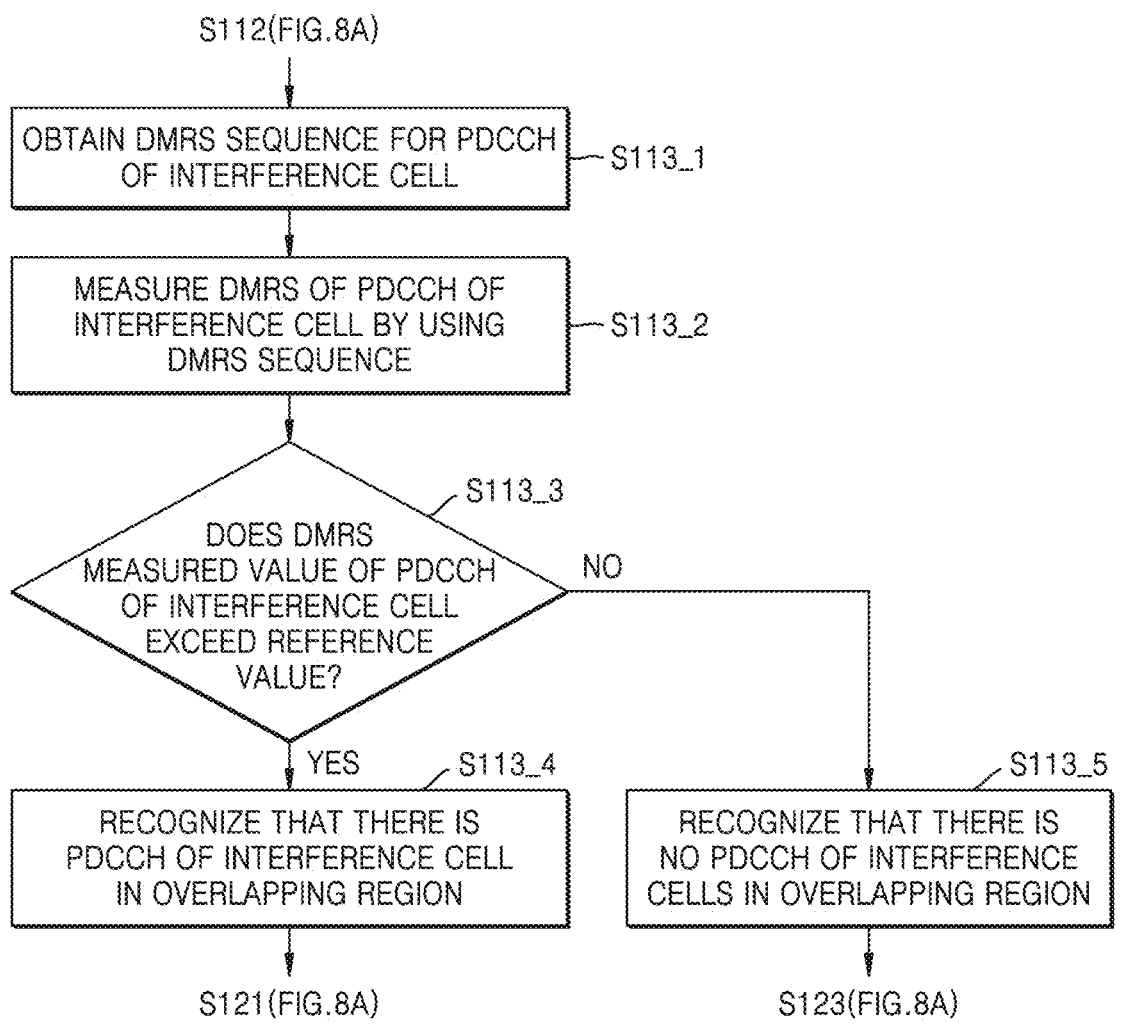
FIG. 8B is a flowchart of an example of operation S113 of FIG. 8A.

FIG. 8A is a flowchart of another example of operation S110 and operation S120 of FIG. 6, and FIG. 8B is a flowchart of an example of operation S113 of FIG. 8A.

Referring to FIG. 8A, compared to FIG. 7, operation S113 may be further included for more accurate demodulation. In detail, when the result of operation S112 is 'YES', operation S113 may be performed in which the UE determines whether the PDCCH of the interference cell actually exists in the overlapping region. As described above, the UE may identify the coreset (or the PDCCH region) of the interference cell through the coreset configuration information of the interference cell, but is unable to determine whether the PDCCH transmitted from the interference cell is actually included in the coreset only from the coreset configuration information of the interference cell. Thus, the configuration related information of the PDCCH of the interference cell may further include the DMRS configuration information of the PDCCH of the interference cell for operation S113. The UE may perform operation S113, based on the DMRS configuration information of the PDCCH of the interference cell.

When the result of operation S113 is 'YES', operation S121 may be performed. When the result of operation S113 is 'NO', operation S123 may be performed.

Referring further to FIG. 8B, subsequent to operation S112 of FIG. 8A, in operation S113_1, the UE may obtain a DMRS sequence that conforms to the DMRS of the PDCCH of the interference cell. The UE may generate a DMRS sequence that conforms to a scrambling ID included in the DMRS configuration information of the PDCCH of the interference cell, by referring to the scrambling ID.

In operation S113_2, the UE may measure the DMRS of the PDCCH of the interference cell by using the DMRS sequence. According to embodiments, the UE may measure the DMRS of the PDCCH of the interference cell by correlating the DMRS sequence with the DMRS of the PDCCH of the interference cell.

In operation S113_3, the UE may determine whether a DMRS measured value of the PDCCH of the interference cell exceeds a reference value.

When the result of operation S113_3 is 'YES', operation S113_4 may be performed in which the UE recognizes that there is the PDCCH of the interference cell in the overlapping region, and may be followed by operation S121 of FIG. 8A. According to embodiments, the UE may consider the DMRS measured value of the PDCCH of the interference cell as a measured value for an interference for the PDSCH corresponding to the overlapping region, and may use the DMRS measured value in operation S121 of FIG. 8A.

When the result of operation S113_3 is 'NO', operation S113_5 may be performed in which the UE recognizes that there is no PDCCH of the interference cell in the overlapping region, and may be followed by operation S123 of FIG. 8A.

Figure 9:
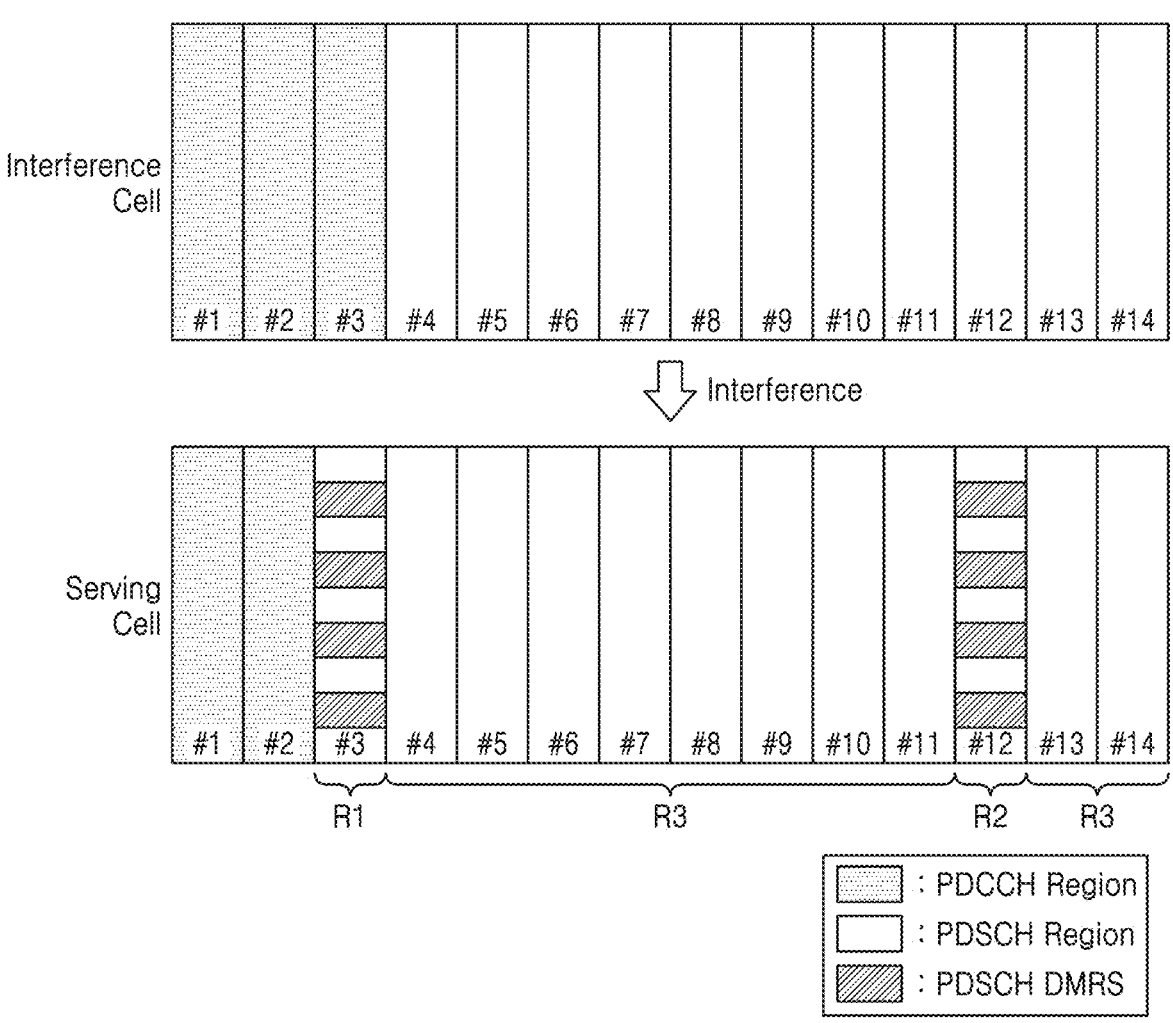
FIGS. 9 and 10 are views for explaining demodulation by UE according to embodiments.
Figure 10:
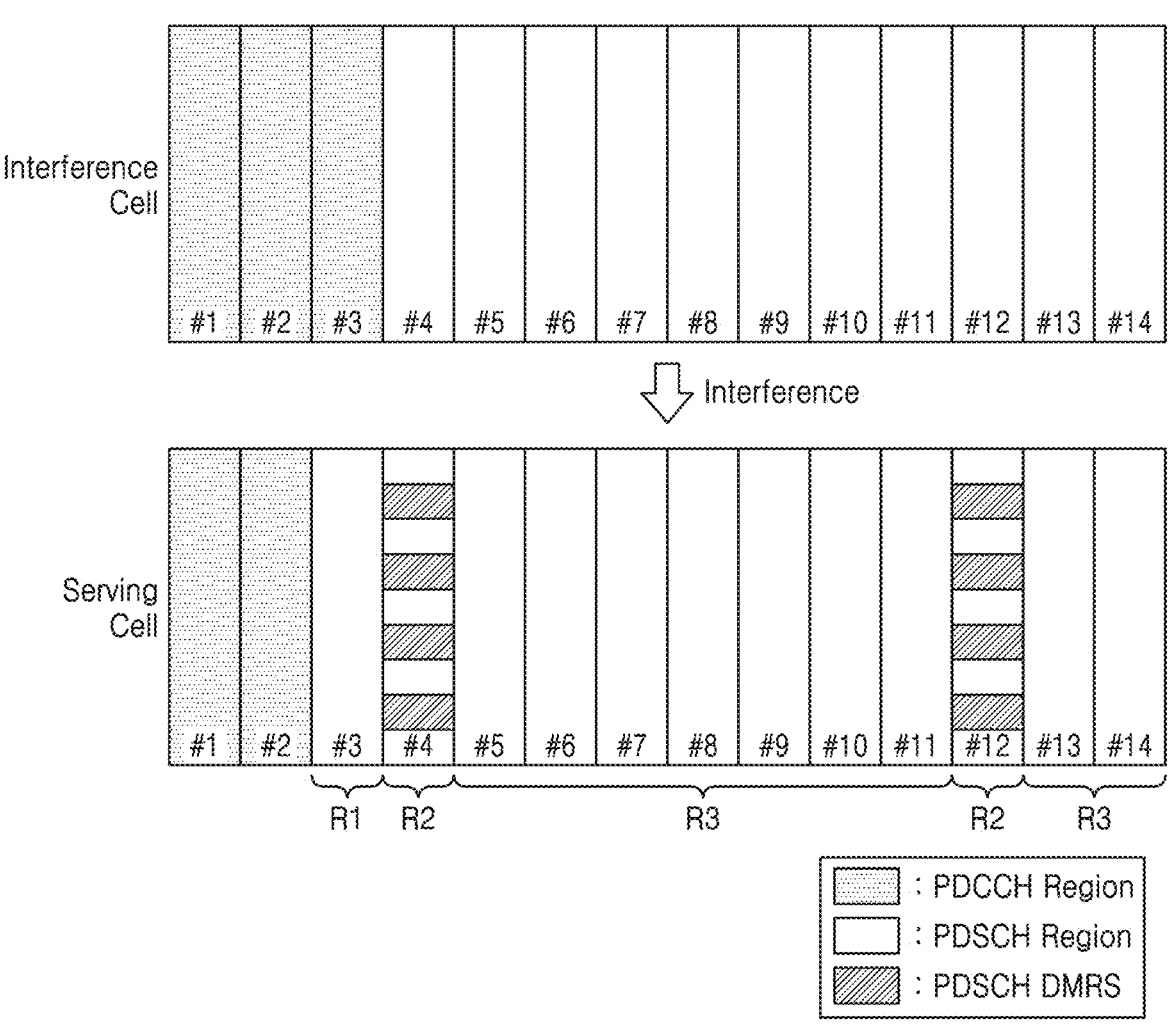

FIGS. 9 and 10 are views for explaining demodulation by UE according to embodiments. It is assumed in FIGS. 9 and 10 that a duration of the PDCCH region of the interference cell conforms to three symbols #1, #2, and #3 and a duration of the PDCCH region of the serving cell conforms to two symbols #1 and #2. The PDSCH region of the interference cell may include fourth through fourteenth symbols #4 through #14, and the PDSCH region of the serving cell may include third through fourteenth symbols #3 through #14. It is also assumed that the PDCCH region and the PDSCH region of the serving cell overlap the PDCCH region and the PDSCH region of the interference cell. However, FIGS. 9 and 10 illustrate examples to aid in understanding of embodiments, and the inventive concepts are not construed as being limited thereto.

Referring to FIG. 9, the PDCCH region of the interference cell and the PDSCH region of the serving cell may overlap each other in the third symbol #3, and thus, a region corresponding to the third symbol #3 may correspond to a first region R1 (or referred to as the overlapping region). The PDSCH region of the interference cell and the PDSCH region of the serving cell may overlap each other in the fourth through fourteenth symbols #4 through #14, and thus, a region corresponding to the fourth through fourteenth symbols #4 through #14 may correspond to the remaining region. The remaining region may include a second region R2 where the DMRS of the PDSCH (PDSCH DMRS) of the serving cell exists and a third region R3 where the DRMS (PDSCH DMRS) does not exist.

Embodiments in a first case where the configuration related information of the PDCCH of the interference cell does not include the DMRS configuration information of the PDCCH, and a second case where the DMRS configuration information of the PDCCH, will now be described, and redundant descriptions between the first and second cases will be omitted.

First, regarding the first case, the UE may identify the first, second, and third regions R1, R2, and R3, based on the configuration related information of the PDCCH. The UE may measure a reception intensity in the third symbol #3 and the DMRS of the PDSCH (PDSCH DMRS) of the serving cell, and subtract a measured value of the DMRS from the measured reception intensity to thereby consider a result of the subtraction as an interference in the first region R1. Herein, the measurement of the DMRS of the PDSCH of the serving cell may include an operation of generating the DMRS sequence conforming to the DMRS of the PDSCH of the serving cell and correlating the generated DMRS sequence with the DMRS of the PDSCH of the serving cell. The UE may demodulate a PDSCH corresponding to the first region R1 after performing the first interference whitening by applying the first covariance matrix to an interference in the first region R1. The UE may measure a reception intensity in the twelfth symbol #12 and the DMRS of the PDSCH (PDSCH DMRS) of the serving cell, and subtract a measured value of the DMRS from the measured reception intensity to thereby consider a result of the subtraction as an interference in the second region R2. The UE may demodulate a PDSCH corresponding to the second region R2 after performing the second interference whitening by applying the second covariance matrix to an interference in the second region R2. Assuming that the interference in the second region R2 is the same as or similar to an interference in the third region R3, the UE may demodulate a PDSCH corresponding to the third region R3 by using the interference in the second region R2. In other words, the UE may distinguish the first region R1 from the remaining region, namely, the second and third regions R2 and R3, and demodulate the PDSCH.

Regarding the second case, the UE may additionally determine whether the PDCCH of the interference cell exists in the first region R1, based on the DMRS configuration information of the PDCCH of the interference cell. When the PDCCH of the interference cell does not exist in the first region R1, the UE may demodulate the PDSCH corresponding to the third region R3 by using the interference in the first region R1 and the interference in the second region R2. For example, the UE may demodulate the PDSCH corresponding to the third region R3 by using a sum average between the interference in the first region R1 and the interference in the second region R2 or a sum average between an interference in the first region R1, to which a first average has been applied, and an interference in the second region R2 to which a second average has been applied. When the PDCCH of the interference cell exists in the first region R1, the UE may directly measure the interference in the first region R1 by generating the DMRS sequence from the DMRS configuration information of the PDCCH of the interference cell and measuring the DMRS of the PDCCH of the interference cell by using the DMRS sequence. The UE may demodulate the PDSCH corresponding to the first region R1 by using the directly-measured interference of the first region R1.

Referring further to FIG. 10, unlike FIG. 9, the DMRS of the PDSCH (PDSCH DMRS) of the serving cell may exist in the fourth symbol #4 instead of the third symbol #3. An example in a case where the configuration related information of the PDCCH of the interference cell includes the DMRS configuration information of the PDCCH will now be described.

The UE may identify the first, second, and third regions R1, R2, and R3, based on the configuration related information of the PDCCH. The UE may measure a reception intensity in the fourth symbol #4 and the DMRS of the PDSCH (PDSCH DMRS) of the serving cell, and subtract a measured value of the DMRS from the measured reception intensity to thereby consider a result of the subtraction as an interference in the fourth symbol #4. The UE may measure a reception intensity in the twelfth symbol #12 and the DMRS of the PDSCH (PDSCH DMRS) of the serving cell, and subtract a measured value of the DMRS from the measured reception intensity to thereby consider a result of the subtraction as an interference in the twelfth symbol #12. The UE may demodulate the PDSCH corresponding to the second region R2 after performing the second interference whitening by applying the second covariance matrix to the interferences in the fourth and twelfth symbols #4 and #12 (or the interference in the second region R2). Assuming that the interference in the second region R2 is the same as or similar to the interference in the third region R3, the UE may demodulate the PDSCH corresponding to the third region R3 by using the interference in the second region R2. For example, the UE may demodulate the PDSCH corresponding to the third region R3 by using a sum average between the interference in the fourth symbol #4 and the interference in the twelfth symbol #12, or a sum average between the interference in the fourth symbol #4 to which the first average has been applied and the interference in the twelfth symbol #12 to which the second average has been applied.

The UE may additionally determine whether the PDCCH of the interference cell exists in the first region R1, based on the DMRS configuration information of the PDCCH of the interference cell. When the PDCCH of the interference cell does not exist in the first region R1, the UE may demodulate the PDSCH corresponding to the first region R1 by using the interference in the second region R2. For example, the UE may demodulate the PDSCH corresponding to the first region R1 by using the sum average between the interference in the fourth symbol #4 and the interference in the twelfth symbol #12, or the sum average between the interference in the fourth symbol #4 to which the first average has been applied and the interference in the twelfth symbol #12 to which the second average has been applied. When the PDCCH of the interference cell exists in the first region R1, the UE may directly measure the interference in the first region R1 by generating the DMRS sequence from the DMRS configuration information of the PDCCH of the interference cell and measuring the DMRS of the PDCCH of the interference cell by using the DMRS sequence. The UE may demodulate the PDSCH corresponding to the first region R1 by using the directly-measured interference of the first region R1.

Figure 11:
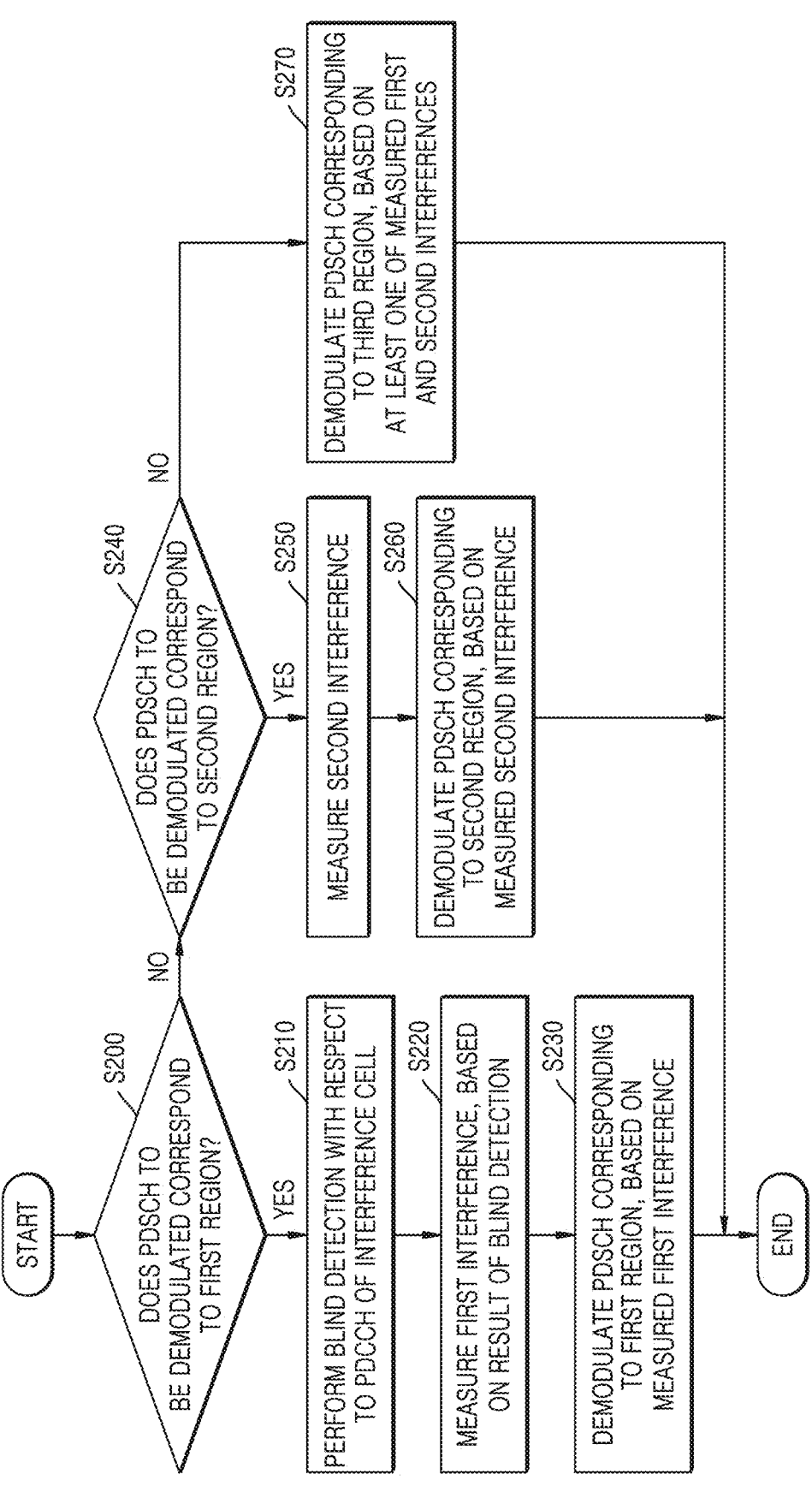
FIG. 11 is a flowchart of a demodulation method performed by UE, according to embodiments.

FIG. 11 is a flowchart of a demodulation method performed by the UE, according to embodiments.

Referring to FIG. 11, in operation S200, the UE may determine whether a PDSCH (e.g., a portion of a PDSCH) to be demodulated corresponds to a first region. As described above with reference to FIGS. 9 and 10, the first region may correspond to an overlapping region, and second and third regions to be described later may correspond to a remaining region. The DMRS of the PDSCH of the serving cell may exist in the second region.

When the result of operation S200 is 'YES', operation S210 may be performed in which the UE performs blind detection with respect to the PDCCH of the interference cell. Herein, the blind detection with respect to the PDCCH of the interference cell may include an operation, performed by the UE, of checking whether the PDCCH of the interference cell exists in the first region, based on the DMRS configuration information of the PDCCH of the interference cell. For example, the UE may generate the DMRS sequence from the DMRS configuration information of the PDCCH of the interference cell, and may directly measure the DMRS of the PDCCH of the interference cell by using the generated DMRS sequence. When a measured value exceeds a reference value, the UE may recognize that the PDCCH of the interference cell exists in the first region. When the measured value is less than or equal to the reference value, the UE may recognize that the PDCCH of the interference cell does not exist in the first region. In operation S220, the UE may measure a first interference, based on a result of the blind detection. For example, when the PDCCH of the interference cell exists in the first region, the UE may consider the measured value in operation S210 as the first interference. As another example, when the PDCCH of the interference cell does not exist in the first region, the UE may measure the first interference in the manner described above with reference to FIGS. 9 and 10. In operation S230, the UE may demodulate the PDSCH corresponding to the first region, based on the measured first interference.

When the result of operation S200 is 'NO', operation S240 may be performed in which the UE determines whether the PDSCH to be demodulated corresponds to a second region.

When the result of operation S240 is 'YES', operation S250 may be performed in which the UE measures a second interference in the second region. For example, the UE may measure a reception intensity in the second region and the DMRS of the PDSCH of the serving cell, and subtract the measured value of the DMRS from the measured reception intensity to thereby consider a result of the subtraction as a second interference in the second region. In operation S260, the UE may demodulate the PDSCH corresponding to the second region, based on the measured second interference.

When the result of operation S240 is 'NO', operation S270 may be performed in which the UE demodulates a PDSCH corresponding to a third region, based on at least one of the measured first and/or second interferences. The UE may select at least one of the measured first and/or second interferences, based on the result of the blind detection, and may use the selected interference to demodulate the PDSCH corresponding to the third region. For example, when the PDCCH of the interference cell does not exist in the first region, the UE may demodulate the PDSCH corresponding to the third region, based on the measured first and second interferences, and, when the PDCCH of the interference cell exists in the first region, the UE may demodulate the PDSCH corresponding to the third region, based on the measured second interference.

Figure 12:
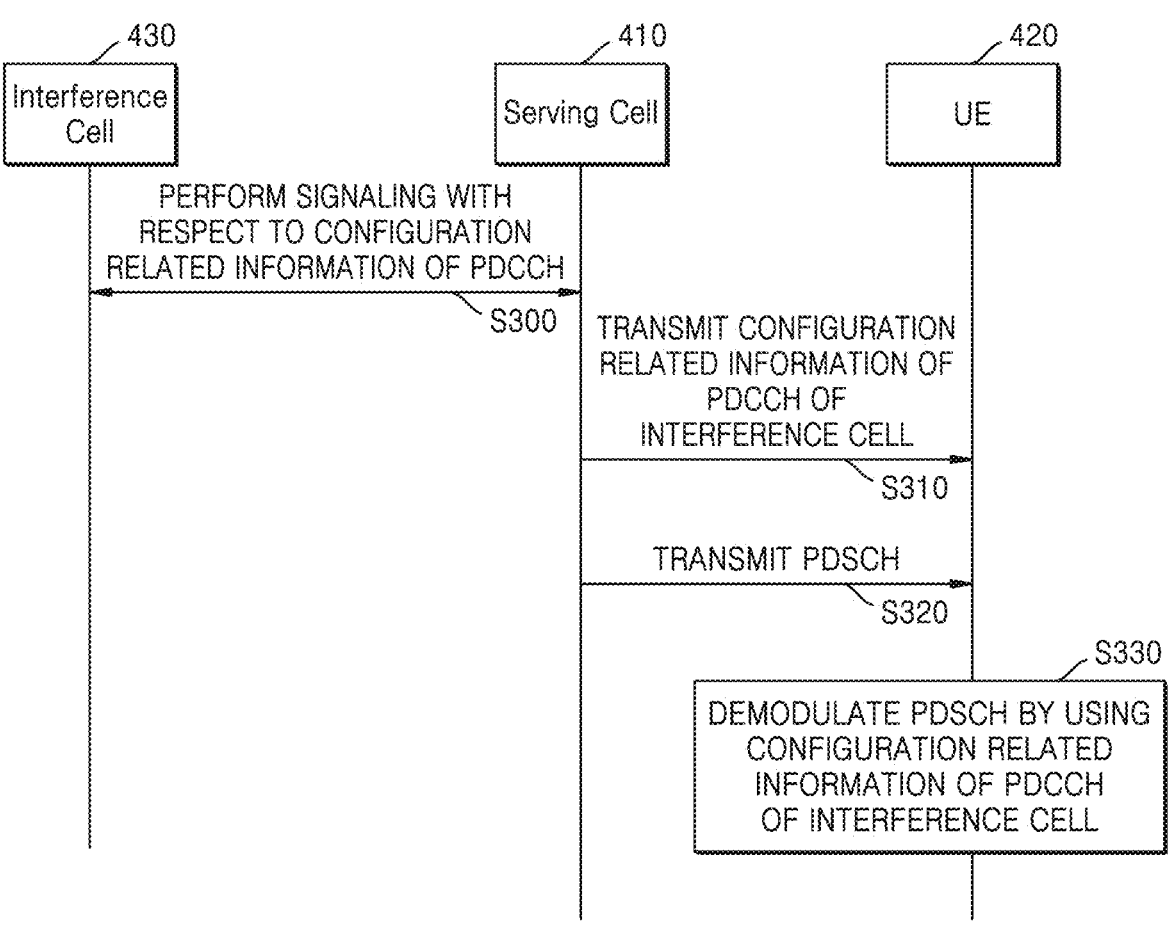
FIG. 12 is a flowchart of an operation method of a wireless communication system, according to embodiments.

FIG. 12 is a flowchart of an operation method of a wireless communication system, according to embodiments. Referring to FIG. 12, the wireless communication system may include a serving cell 410, UE 420, and/or an interference cell 430.

Referring to FIG. 12, in operation S300, the serving cell 410 and the interference cell 430 may perform signaling with respect to the configuration related information of the PDCCH. For example, the serving cell 410 may request the interference cell 430 for the configuration related information of the PDCCH and receive the configuration related information of the PDCCH. As another example, the serving cell 410 and the interference cell 430 may transmit the configuration related information of their PDCCHs to each other. The interference cell may be changed with a location change, a communication state change, etc. within the coverage of the UE 420, and, when a change in the interference cell is checked, the serving cell 410 may perform signaling with respect to the configuration related information of the PDCCH, with the changed interference cell.

In operation S310, the serving cell 410 may transmit the configuration related information of the PDCCH of the interference cell to the UE 420. For example, the UE 420 may store the configuration related information of the PDCCH of the interference cell in a memory of the UE 420.

In operation S320, the serving cell 410 may transmit the PDSCH to the UE 420.

In operation S330, the UE 420 may demodulate the PDSCH by using the configuration related information of the PDCCH of the interference cell.

Figure 13A:
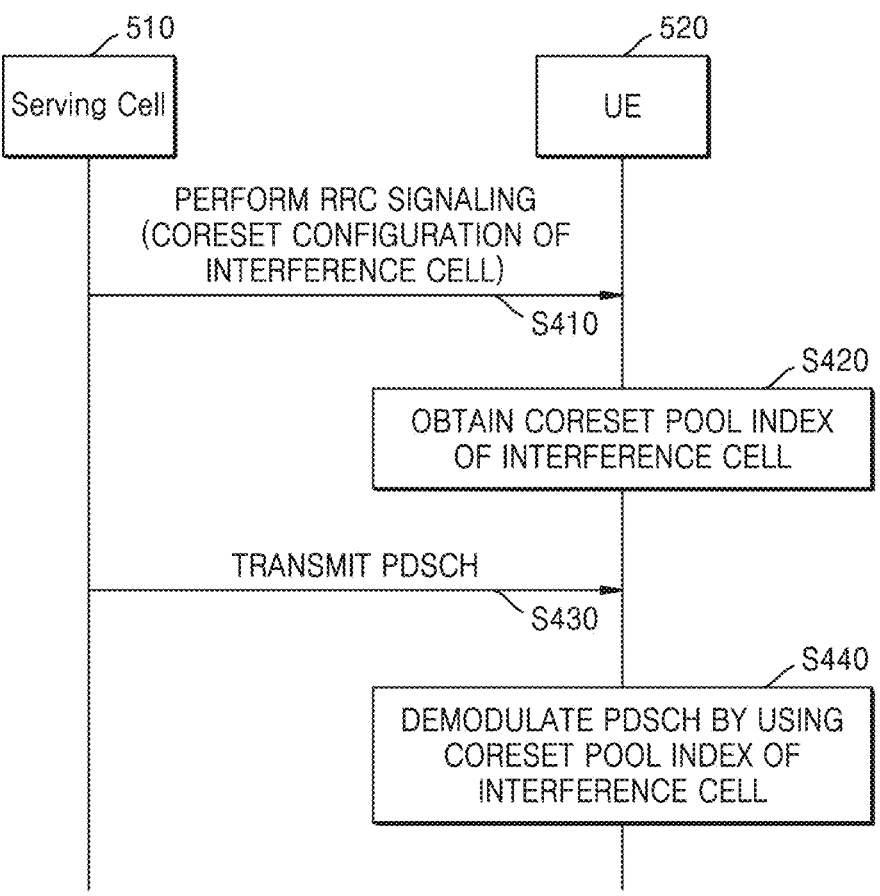
FIG. 13A is a flowchart of an operation method of a wireless communication system, according to embodiments.

FIG. 13A is a flowchart of an operation method of a wireless communication system, according to embodiments, and FIG. 13B is a table TB for explaining FIG. 13A in detail. Referring to FIG. 13A, the wireless communication system may include a serving cell 510 and UE 520.

Referring to FIG. 13A, in operation S410, the serving cell 510 may perform RRC signaling with the UE 520. The RRC signaling may include coreset configuration of the interference cell.

In operation S420, the UE 520 may obtain a coreset pool index (e.g., coreset pool index indicating a coreset configuration) of the interference cell according to the coreset configuration of the interference cell.

In operation S430, the serving cell 510 may transmit the PDSCH to the UE 520.

In operation S440, the UE 520 may demodulate the PDSCH by using the coreset pool index of the interference cell.

Referring further to FIG. 13B, respective values A1 to Ak, B1 to Bk, C1 to Ck, and D1 to Dk of 'SS/PBCH block and CORESET multiplexing pattern', 'Number of RBs', 'Number of Symbols', and 'Offset (RBs), respectively, may be set according to coarse pool indexes 1 through kin the table TB.

The UE 520 may identify the PDCCH of the interference cell by obtaining values conforming to the core set pool index obtained from the table TB. The UE 520 may demodulate the PDSCH, based on a result of the identification.

According to embodiments, the table TB may be stored in a memory of the UE 520, and may be read from the UE 520 during a demodulation operation on the PDSCH of the UE 520.

Figure 14:
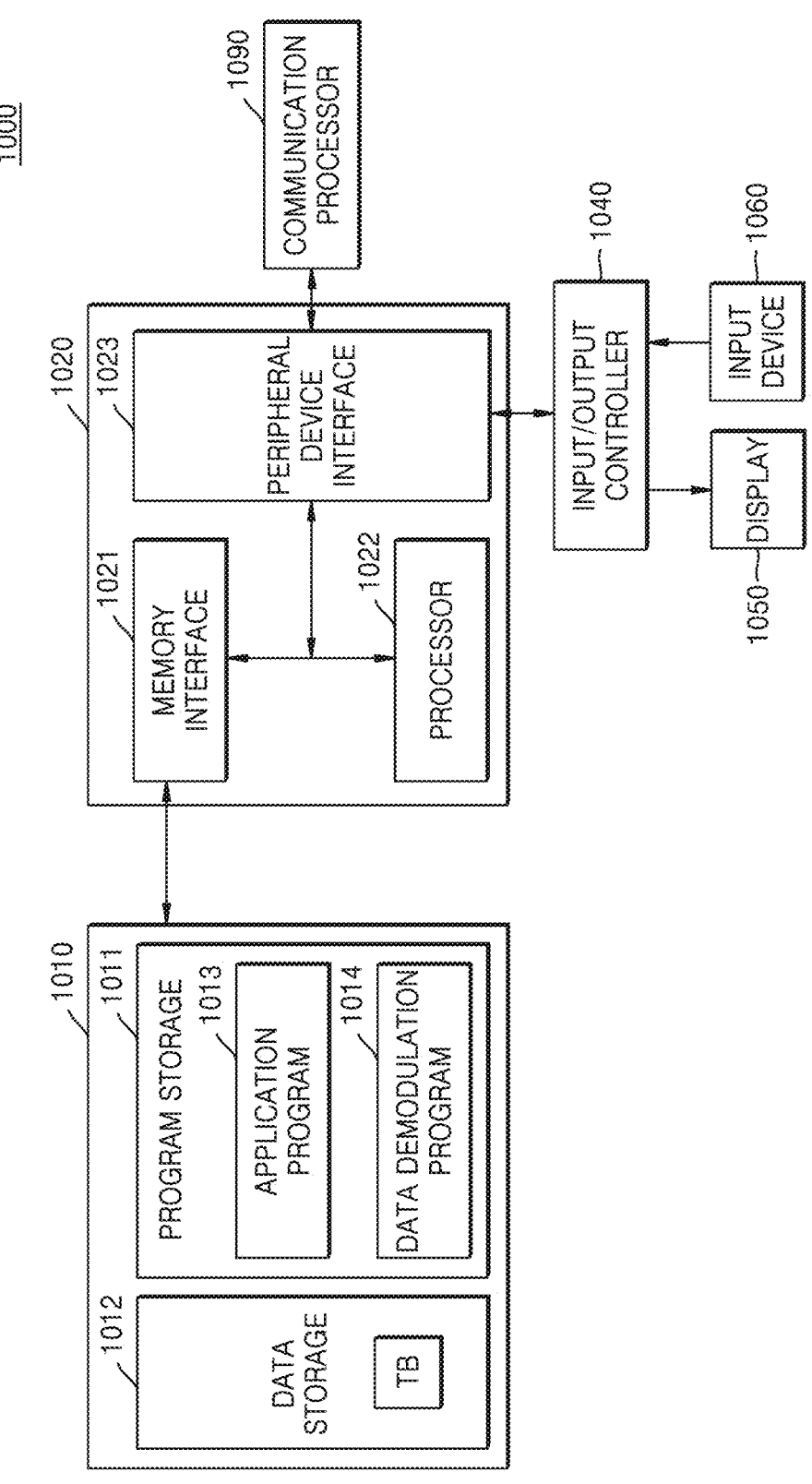
FIG. 14 is a block diagram of an electronic device according to embodiments.

FIG. 14 is a block diagram of an electronic device 1000 according to embodiments. The electronic device 1000 may be a UE (e.g., the UE 14) according to embodiments.

Referring to FIG. 14, the electronic device 1000 may include a memory 1010, a processor unit 1020, an input/output controller 1040, a display 1050, an input device 1060, and/or a communication processor 1090. There may be a plurality of memories 1010. Each element will be described below.

The memory 1010 may include a program storage 1011, which stores a program for controlling an operation of the electronic device 1000, and a data storage 1012, which stores data generated during execution of the program. The data storage 1012 may store data for the operation of an application program 1013 and the operation of a data demodulation program 1014, and/or may store data generated from the operations of the application program 1013 and the data demodulation program 1014. The data storage 1012 may store the configuration related information of the PDCCH of the interference cell according to embodiments and/or the table TB described above with reference to FIG. 13B.

The program storage 1011 may include the application program 1013 and/or the data demodulation program 1014. At this time, a program included in the program storage 1011 may be a set of instructions and expressed as an instruction set. The application program 1013 may include program code for executing various applications run by the electronic device 1000. In other words, the application program 1013 may include code (or commands) related to various applications run by a processor 1022.

The data demodulation program 1014 may include program code (or commands) for identifying a PDCCH of an inference cell, based on configuration related information of the PDCCH of the interference cell, and demodulating a PDSCH of a serving cell, based on a result of the identification, according to embodiments. The processor 1022 may perform the demodulation operations with respect to the PDSCH of the serving cell according to embodiments by executing the data demodulation program 1014.

The communication processor 1090 of the electronic device 1000 may perform communication functions for voice communication and data communication. A peripheral device interface 1023 may control connection among the input/output controller 1040, the communication processor 1090, the processor 1022, and/or a memory interface 1021. The processor 1022 controls a plurality of base stations to provide a service by using at least one software program. At this time, the processor 1022 may execute at least one program stored in the memory 1010 to provide a service corresponding to the program.

The input/output controller 1040 may provide an interface between an input/output device, such as the display 1050 or the input device 1060, and the peripheral device interface 1023. The display 1050 displays status information, input text, a moving picture, and/or a still picture, for example. For example, the display 1050 may display information about an application program run by the processor 1022.

The input device 1060 may provide input data, which is generated by the selection of the electronic device 1000, to the processor unit 1020 through the input/output controller 1040. At this time, the input device 1060 may include, for example, a keypad, which includes at least one hardware button, and a touch pad sensing touch information. For example, the input device 1060 may provide touch information, such as a touch, a movement of the touch, or the release of the touch, which is detected through a touch pad, to the processor 1022 through the input/output controller 1040.

Figure 15:
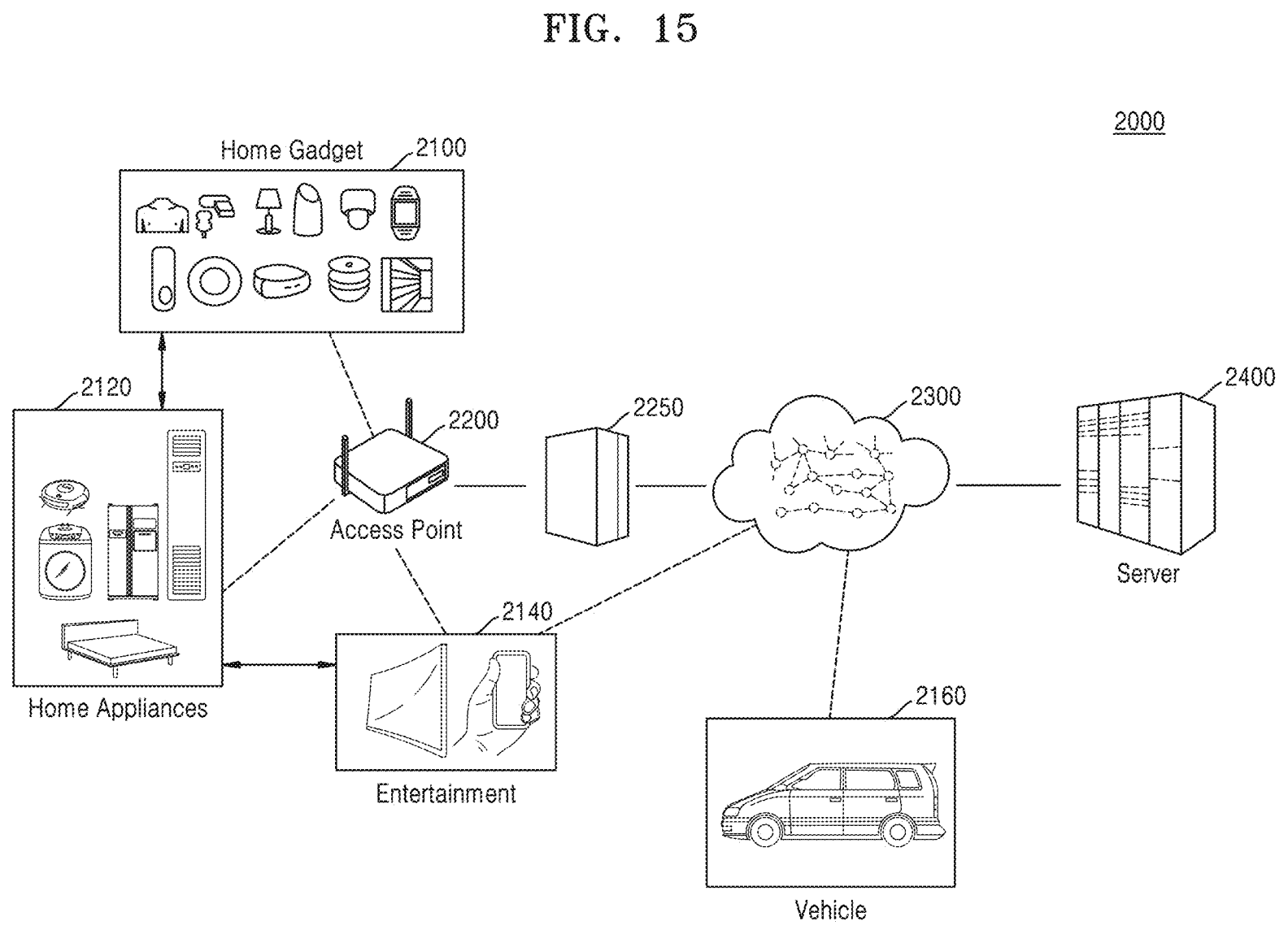

FIG. 15 is a conceptual diagram of an Internet of things (IoT) network system 2000 according to embodiments.

Referring to FIG. 14, the IoT network system 2000 may include a plurality of IoT devices, an AP 2200, a gateway 2250, a wireless network 2300, and/or a server 2400. IoT may refer to a network among things using wired/wireless communication.

The IoT devices may be grouped by the characteristics thereof. For example, the IoT devices may be divided into a group of home gadgets 2100, a group of home appliances/furniture 2120, a group of entertainment equipment 2140, and/or a group of vehicles 2160. A plurality of IoT devices, e.g., the home gadgets 2100, the home appliances/furniture 2120, and the entertainment equipment 2140, may be connected to a communication network or another IoT device through the AP 2200. The AP 2200 may be embedded in one IoT device. The gateway 2250 may change a protocol to allow the AP 2200 to access an external wireless network. IoT devices, e.g., the home gadgets 2100, the home appliances/furniture 2120, and the entertainment equipment 2140, may be connected to an external communication network through the gateway 2250. The wireless network 2300 may include Internet and/or a public network. IoT devices, e.g., the home gadgets 2100, the home appliances/furniture 2120, the entertainment equipment 2140, and the vehicles 2160, may be connected to the server 2400, which provides a certain service, through the wireless network 2300, and users may use the service through at least one of the IoT devices, e.g., the home gadgets 2100, the home appliances/furniture 2120, and the entertainment equipment 2140, and the vehicles 2160. IoT devices, e.g., the home gadgets 2100, the home appliances/furniture 2120, the entertainment equipment 2140, and the vehicles 2160, may perform data demodulation operations in consideration of interference according to embodiments.

Conventional wireless communication devices perform demodulation of a PDSCH of a serving cell including removing interference caused by a PDSCH of an interference cell. In so doing, the conventional wireless communication devices assume that a control region over which each cell transmits a PDCCH is fixed, and thus, the interference for the PDSCH of the serving cell is caused by the PDSCH of the interference cell. However, in NR networks, a coreset for each cell may be variously configured such that the interference for the PDSCH of the serving cell may be caused by the PDCCH of the interference cell rather than the PDSCH of the interference cell. Also, since the reception intensity of a PDSCH is greater than that of a PDCCH, an erroneous assumption that the interference from the interference cell is due to a PDSCH rather than a PDCCH results in an underestimation of the interference caused by the interference cell. This erroneous estimation of the interference caused by the interference cell on the PDSCH of the serving cell reduces demodulation (and/or reception) performance with respect to the PDSCH of the serving cell, and thus, reduces the communication performance of the conventional wireless communication devices.

However, according to embodiments, improved wireless communication devices are provided for demodulating a PDSCH of a serving cell. Specifically, the improved wireless communication devices may demodulate the PDSCH of the serving cell based on configuration information of a PDCCH of an interference cell. For example, the improved wireless communication devices may perform a first demodulation on a portion of a PDSCH region of the serving cell that overlaps a PDCCH region of the interference cell, and perform a second demodulation on a remaining portion of the PDSCH region. Accordingly, the improved wireless communication devices overcome the deficiencies of the conventional wireless communication devices to at least measure the interference caused by the interference cell on the PDSCH of the serving cell with greater accuracy, thereby improving the demodulation (and/or reception) performance with respect to the PDSCH of the serving cell, and thus, improving the communication performance of the improved wireless communication devices.

According to embodiments, operations described herein as being performed by the wireless communication system WCS, the first cell 12, the UE 14, the second cell 22, the serving cell 100, the controller 110, the processing circuit 130, the plurality of RF transceivers 142_1 through 142_$n$, the scheduler 112, the UE 150, the controller 160, the processing circuit 180, the RF transceiver 192, the demodulation circuitry 162, the serving cell 410, the UE 420, the interference cell 430, the serving cell 510, the UE 520, the electronic device 1000, the application program 1013, the data demodulation program 1014, the processor unit 1020, the input/output controller 1040, the communication processor 1090, the peripheral device interface 1023, the processor 1022, the memory interface 1021, the IoT network system 2000, the AP 2200, the gateway 2250, the server 2400 the group of home gadgets 2100, the group of home appliances/furniture 2120, the group of entertainment equipment 2140 and/or the group of vehicles 2160 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 120, the memory 170 and/or the memory 1010). A software module may reside in Random Access Memory (RAM), flash memory, Read Only Memory (ROM), Electrically Programmable ROM (EPROM), Electrically Erasable Programmable ROM (EE-PROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

While the inventive concepts have been particularly shown and described with reference to embodiments thereof, it will be understood that various changes in form and details may be made therein without departing from the spirit and scope of the following claims.

What is claimed is:

1. An operation method of user equipment (UE) in communication with a serving cell, the operation method comprising:

receiving configuration information of a first physical downlink control channel (PDCCH) from the serving cell, the first PDCCH corresponding to an interference cell;

identifying the first PDCCH of the interface cell based on the configuration information; and demodulating a physical downlink shared channel (PDSCH) based on a result of the identifying, the PDSCH being received from the serving cell, wherein, the identifying the first PDCCH cell comprises:

identifying a location of a PDCCH region of the interference cell; and determining whether a PDSCH region of the serving cell overlaps the PDCCH region of the interference cell, and the identifying the first PDCCH further comprises determining whether a signal of the first PDCCH exists in an overlapping region in which the PDSCH region and the PDCCH region overlap.

2. The operation method of claim 1, wherein the configuration information comprises at least one of:

coreset configuration information of the interference cell; or search space configuration information of the interference cell.

3. The operation method of claim 1, wherein the demodulating the PDSCH comprises:

performing first demodulation on a first portion of the PDSCH corresponding to the overlapping region; and performing second demodulation on a second portion of the PDSCH corresponding to a remaining region, the remaining region not including the overlapping region.

4. The operation method of claim 3, wherein the performing the first demodulation comprises:

performing interference whitening on the first portion of the PDSCH based on a measured value of an interference of the first PDCCH; and demodulating the first portion of the PDSCH after the performing the interference whitening.

5. The operation method of claim 3, wherein the first demodulation uses a first interference whitening based on a first covariance matrix; and the second demodulation uses a second interference whitening based on a second covariance matrix, the second covariance matrix being different from the first covariance matrix.

6. The operation method of claim 4, wherein the measured value of the interference comprises a measured value of a demodulation reference signal (DMRS) of the first PDCCH.

7. The operation method of claim 1, wherein the configuration information comprises DMRS configuration information of the first PDCCH; and the determining whether the signal of the first PDCCH exists comprises measuring a DMRS of the first PDCCH using a DMRS sequence obtained based on the DMRS configuration information, and determining whether the first PDCCH exists based on a measured value of the DMRS of the first PDCCH.

8. The operation method of claim 1, wherein coreset configuration information of the serving cell is different from coreset configuration information of the interference cell.

9. The operation method of claim 1, wherein the receiving the configuration information of the first PDCCH is performed during radio resource control (RRC) signaling with the serving cell.

10. The operation method of claim 9, wherein the configuration information of the first PDCCH comprises a coreset pool index of coreset configuration.

11. The operation method of claim 1, wherein the determining whether the signal of the first PDCCH exists includes comparing a measured value of a demodulation reference signal (DMRS) of the first PDCCH to a reference value.

12. An operation method of user equipment (UE) in communication with a serving cell, the operation method comprising:

receiving configuration information of a first physical downlink control channel (PDCCH) from the serving cell, the first PDCCH corresponding to an interference cell;

identifying a difference between a duration of a PDCCH region of the serving cell and a duration of a PDCCH region of the interference cell, based on the configuration information; and demodulating a physical downlink shared channel (PDSCH) received from the serving cell based on the difference, the demodulating including, performing first demodulation on a first portion of the PDSCH corresponding to an overlapping subregion between a PDSCH region of the serving cell and the PDCCH region of the interference cell, and performing second demodulation on a second portion of the PDSCH corresponding to a remaining subregion, the remaining subregion not including the overlapping subregion, and the second demodulation being different from the first demodulation.

13. The operation method of claim 12, wherein the identifying the difference comprises distinguishing the overlapping subregion of the PDSCH region of the serving cell and the remaining subregion of the PDSCH region, the overlapping subregion overlapping the PDCCH region of the interference cell.

14. The operation method of claim 12, wherein the first demodulation uses a first interference whitening, the second demodulation uses a second interference whitening, and the first interference whitening is different from the second interference whitening.

15. The operation method of claim 14, wherein the first interference whitening is based on a demodulation reference signal (DMRS) of the first PDCCH; and the second interference whitening is based on a DMRS of the PDSCH.

16. The operation method of claim 14, wherein the first interference whitening uses a first covariance matrix; and the second interference whitening uses a second covariance matrix.

17. User equipment (UE) comprising:

a radio frequency (RF) transceiver configured to receive configuration information of a first physical downlink control channel (PDCCH) from a serving cell, the first PDCCH corresponding to an interference cell; and a controller configured to, determine whether a physical downlink shared channel (PDSCH) and the first PDCCH overlap each other by identifying the first PDCCH based on the configuration information to obtain a determination result, the PDSCH being received from the serving cell, and demodulate the PDSCH based on the determination result, the demodulation of the PDSCH including, performing first demodulation on a first portion of the PDSCH corresponding to an overlapping subregion between a PDSCH region of the serving cell and a PDCCH region of the interference cell, and performing second demodulation on a second portion of the PDSCH corresponding to a remaining subregion, the remaining subregion not including the overlapping subregion, and the second demodulation being different from the first demodulation.

18. The UE of claim 17, wherein the configuration information comprises:

at least one of coreset configuration information of the interference cell;

search space configuration information of the interference cell; or demodulation reference signal (DMRS) configuration information of the first PDCCH.

19. The UE of claim 17, wherein a result of the identifying indicates the overlapping subregion of the PDSCH region of the serving cell and the remaining subregion of the PDSCH region, the overlapping subregion overlapping the first PDCCH.

20. The UE of claim 17, wherein the first demodulation uses a first interference whitening based on a first covariance matrix; and the second demodulation uses a second interference whitening based on a second covariance matrix, the second covariance matrix being different from the first covariance matrix.

* * * * *